US010743223B2

(12) United States Patent
Nakata et al.

(10) Patent No.: US 10,743,223 B2
(45) Date of Patent: Aug. 11, 2020

(54) METHOD OF HANDOVER CONTROL, RELAY APPARATUS, AND METHOD FOR SELECTING TARGET CELL IN RADIO COMMUNICATION SYSTEM

(71) Applicant: NEC CORPORATION, Tokyo (JP)

(72) Inventors: Atsushi Nakata, Tokyo (JP); Yoshio Ueda, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/897,166

(22) PCT Filed: Jun. 9, 2014

(86) PCT No.: PCT/JP2014/003058
§ 371 (c)(1),
(2) Date: Dec. 9, 2015

(87) PCT Pub. No.: WO2014/199621
PCT Pub. Date: Dec. 18, 2014

(65) Prior Publication Data
US 2016/0142952 A1    May 19, 2016

(30) Foreign Application Priority Data

Jun. 10, 2013 (JP) .................... 2013-121564

(51) Int. Cl.
*H04W 84/04* (2009.01)
*H04W 16/32* (2009.01)
(Continued)

(52) U.S. Cl.
CPC ....... *H04W 36/04* (2013.01); *H04W 36/0061* (2013.01); *H04W 36/38* (2013.01);
(Continued)

(58) Field of Classification Search
CPC ... H04W 84/045; H04W 92/02; H04W 16/32; H04W 84/105; H04W 36/08; H04W 36/14
See application file for complete search history.

(56) References Cited

U.S. PATENT DOCUMENTS

2012/0015655 A1*  1/2012  Lee .................. H04W 8/02
                                              455/435.1
2012/0309394 A1* 12/2012  Radulescu ........ H04W 36/0055
                                              455/436
(Continued)

FOREIGN PATENT DOCUMENTS

EP         2415287 A1     2/2012
JP    WO 2011092772 A1 *  8/2011  .............. H04W 4/02
(Continued)

OTHER PUBLICATIONS

"3rd Generation Partnership Project; Technical Specification Group Radio Access Network; UTRAN architecture for 3G Home Node B (HNB); Stage 2 (Release 11 )", 3GPP Standard; 3GPP TS 25.467, 3rd Generation Partnership Project (3GPP), Mobile Competence Centre ; 650, Route Des Lucioles ; F-06921 Sophia-Antipolis Cedex ; France, vol. RAN WG3, No. V11.1.*

(Continued)

*Primary Examiner* — George Eng
*Assistant Examiner* — Umair Ahsan
(74) *Attorney, Agent, or Firm* — Sughrue Mion, PLLC

(57) ABSTRACT

A method of handover control, a relay apparatus, and a method for selecting a target cell are provided that make it possible to identify a target cell in a hand-in phase even in a network topology in which relay apparatuses are connected in multiple stages. In a radio communication system in which a base station controller (14) and a first relay apparatus (1) are connected to a communication network, wherein the base station controller has under its control at (Continued)

least one first base station (12) connected thereto, and the first relay apparatus has under its control at least a second relay apparatus (2) connected thereto, wherein the second relay apparatus has under its control at least one second base station (4-6) connected thereto, the first relay apparatus acquires cell information of a cell controlled by the second base station under the control of the second relay apparatus, and in a hand-in phase for handover from the first base station (12), to which a radio station (16) is wirelessly connected, to the second base station (6), the first relay apparatus identifies a target cell of the handover by using the cell information.

17 Claims, 20 Drawing Sheets

(51) Int. Cl.
    *H04W 36/04*         (2009.01)
    *H04W 36/00*         (2009.01)
    *H04W 36/38*         (2009.01)

(52) U.S. Cl.
    CPC .......... *H04W 16/32* (2013.01); *H04W 84/045* (2013.01); *H04W 84/047* (2013.01)

(56) References Cited

U.S. PATENT DOCUMENTS

| | | | | |
|---|---|---|---|---|
| 2013/0064092 A1* | 3/2013 | Xi | ................ | H04W 92/20 370/235 |
| 2013/0225171 A1* | 8/2013 | Singh | ................ | H04W 36/245 455/436 |
| 2013/0260767 A1* | 10/2013 | Hosono | ................ | H04W 36/04 455/437 |
| 2014/0302853 A1* | 10/2014 | Militano | ........... | H04W 36/0055 455/436 |
| 2016/0381725 A1* | 12/2016 | Spinelli | ............... | H04W 76/022 370/329 |

FOREIGN PATENT DOCUMENTS

| | | | | |
|---|---|---|---|---|
| WO | 2010/112824 A1 | 10/2010 | | |
| WO | WO 2010112824 A1 * | 10/2010 | ............. | H04W 8/02 |
| WO | 2011/092772 A1 | 3/2011 | | |
| WO | 2012/075328 A1 | 6/2012 | | |
| WO | 2012/081501 A1 | 6/2012 | | |

OTHER PUBLICATIONS

3GPPTS 25.467VI 1.1.0 (Dec. 2012) UTRANArchitecture for 3G Home Node B (HNB) Stage 2 (Release 11) (Year: 2012).*
3GPP TR 37.803 V11.1.0, 3rd Generation Partnership Project; Technical Specification Group Radio Access Network; Universal Mobile Telecommunications System (UMTS) and LTE; Mobility enhancements for Home Node B (HNB) and Home enhanced Node B (HeNB) (Release 11), relevant part: Chapter 6.1.3, Legacy UE Mobility, Dec. 2012, pp. 1-118.
International Search Report for PCT/JP2014/003058 dated Aug. 12, 2014 [PCT/ISA/210].
Written Opinion for PCT/JP2014/003058 dated Aug. 12, 2014 [PCT/ISA/237].
Communication dated Jan. 18, 2017 issued from the European Patent Office in counterpart Application No. 14811167.7.
3GPP TS 25.467 V11.1.0, 3rd Generation Partnership Project; Technical Specification Group Radio Access Network; UTRAN architecture for 3G Home Node B (HNB); Stage 2 (Release 11), relevant part: Annex C, Dec. 2012, pp. 1-80.
Communication dated Feb. 28, 2018 issued by the Japanese Patent Office in counterpart Japanese application No. 2017-019354.

* cited by examiner

EXEMPLARY EMBODIMENT

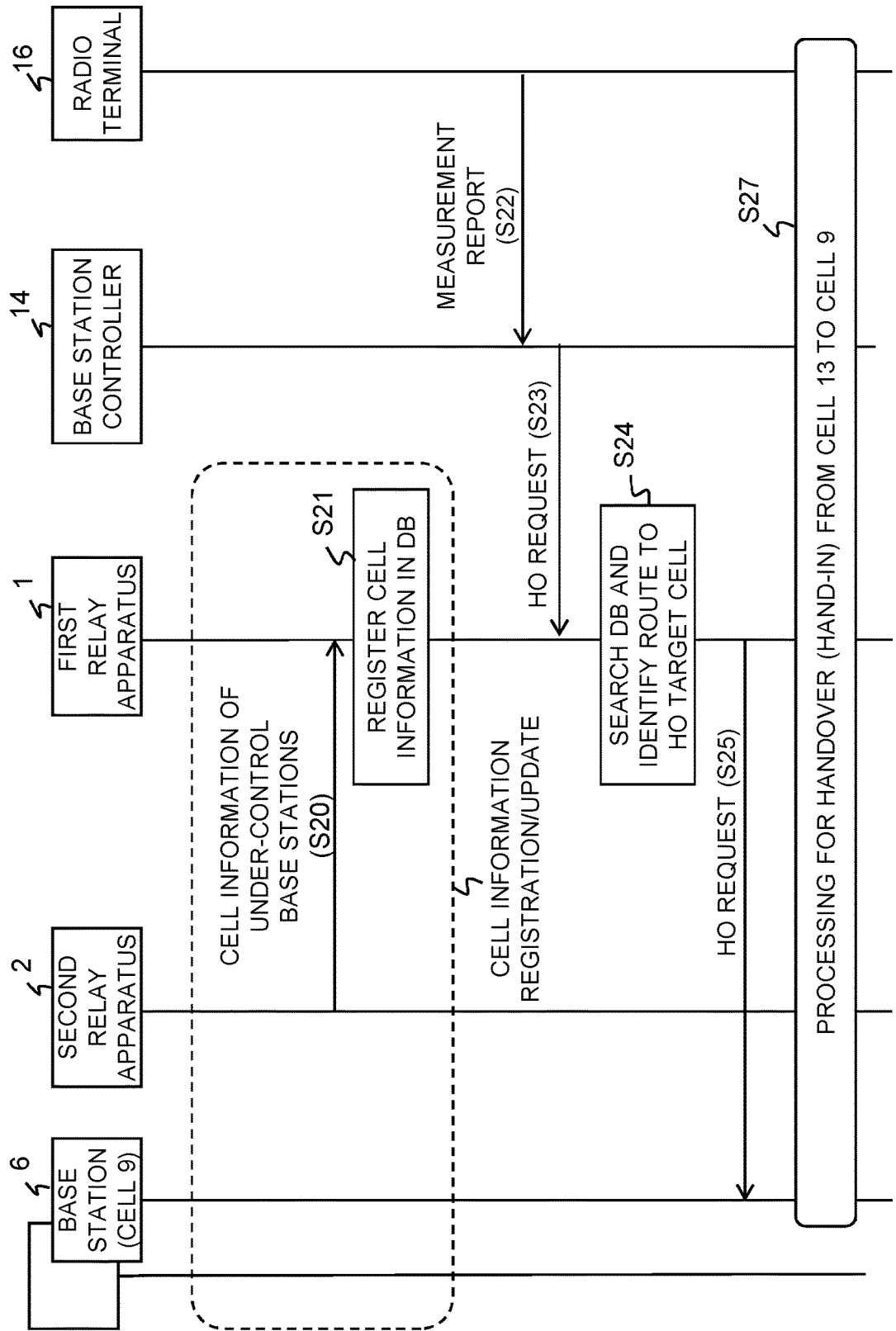

FIG. 7

EXAMPLE OF DATABASE 104

BASE STATION REGISTRATION TABLE

| CELL ID INFORMATION | PSC | ADDRESS |
|---|---|---|
| Cell_ID#1 | PSC#1 | Address#1 |
| Cell_ID#2 | PSC#2 | Address#2 |
| : | : | : |
| Cell_ID#N | PSC#N | Address#3 |

VIRTUAL CELL ID TABLE

| MACROCELL ID INFORMATION | VIRTUAL CELL ID INFORMATION |
|---|---|
| mCell_ID#1 | vCell_ID#1a, vCell_ID#1b |
| mCell_ID#2 | vCell_ID#2a, |
| : | : |
| mCell_ID#N | vCell_ID#Na, vCell_ID#Nb, ... |

CELL INFORMATION AND TIME DIFFERENCE TABLE

| FEMTO CELL ID INFORMA- TION | MACRO CELL ID INFORMA- TION | VIRTUAL CELL ID INFORMA- TION | FEMTO CELL PSC | MACRO CELL PSC | TIME DIFFERENCE BETWEEN MACRO AND FEMTO CELLS | ADDITIONAL INFORMATION |
|---|---|---|---|---|---|---|
| fCell_ID#1 | mCell_ID#1 | vCell_ID #1a, #1b | fPSC#1 | mPSC#1 | delta_OTD(m-f)#1 | delta_OTD(other-f) #11, PSC#11<br>delta_OTD(other-f) #12, PSC#12<br>delta_OTD(other-f) #13, PSC#13 |
| fCell_ID#2 | mCell_ID#2 | vCell_ID #2a | fPSC#2 | mPSC#2 | delta_OTD(m-f)#2 | delta_OTD(other-f) #21, PSC#11<br>delta_OTD(other-f) #22, PSC#22<br>delta_OTD(other-f) #23, PSC#23 |
| : | : | : | : | : | : | : |
| fCell_ID#j | mCell_ID#j | vCell_ID #Na, #Nb | fPSC#j | mPSC#j | delta_OTD(m-f)#j | delta_OTD(other-f) #j1, PSC#j1<br>delta_OTD(other-f) #j2, PSC#j2<br>delta_OTD(other-f) #j3, PSC#j3 |

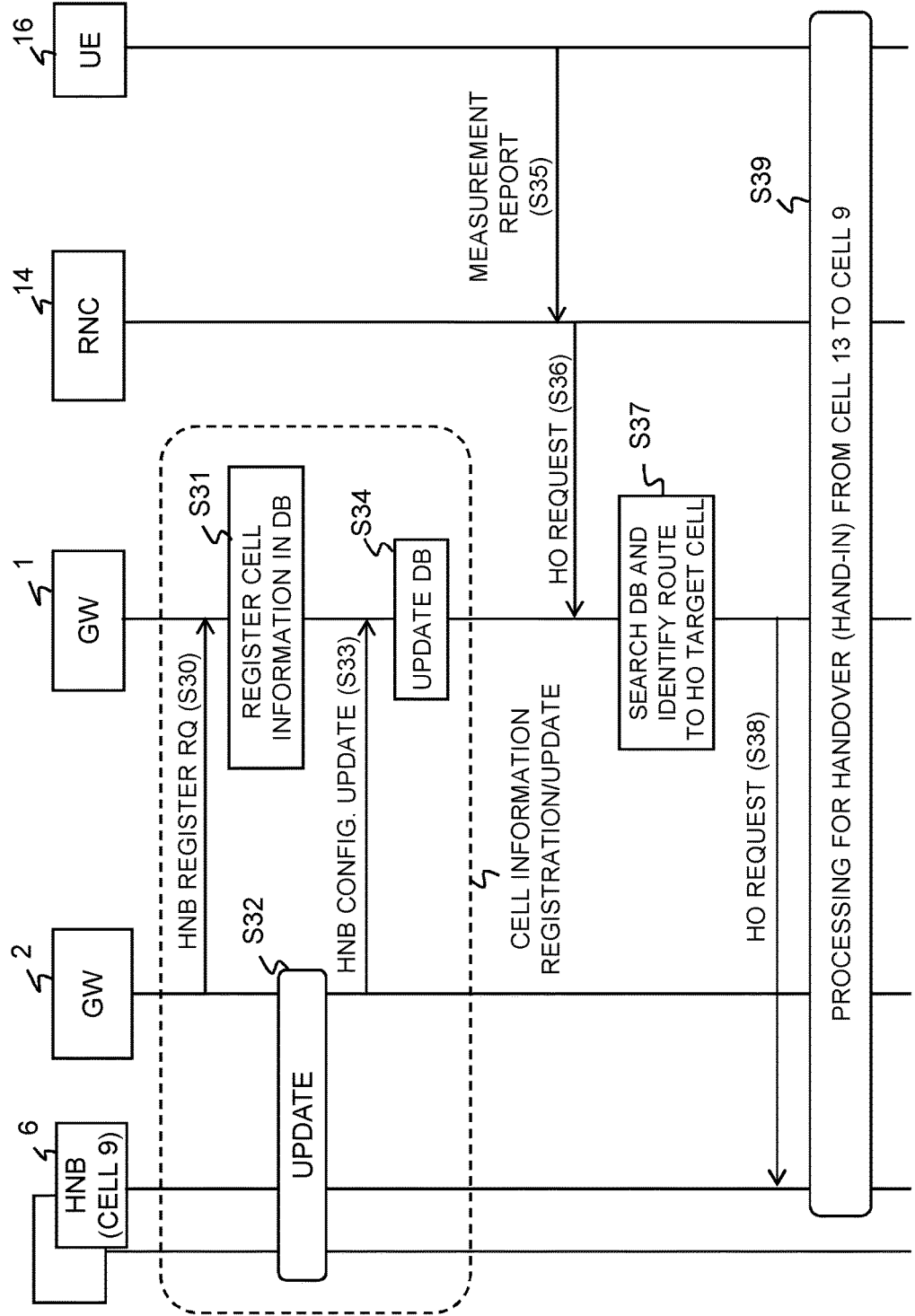

FIG. 10

HNB REGISTER REQUEST MESSAGE (HNB REGISTER REQUEST)

| PARAMETER | PRESENCE | RANGE | IE Type and Reference |
|---|---|---|---|
| Message Type | M | | 9.2.1 |
| HNB Identity | M | | 9.2.2 |
| HNB Location Information | M | | 9.2.3 |
| PLMN-ID | M | | 9.2.14 |
| Cell-ID | M | | 9.2.25 |
| PSC | O | | 9.2.41 |
| .. | | | |
| Local Cell Information | O | 1 to \<maxnoofCells\> | 9.2.x |

9.2.x Local Cell Information

| IE/GROUP NAME | PRESENCE | RANGE | IE Type and Reference |
|---|---|---|---|
| Cell-ID | M | | 9.2.25 |
| PSC | M | | 9.2.41 |
| Neighbour Information | O | 1 to \<maxnoofNeighbours\> | 9.2.y |

9.2.y Neighbour Information

| IE/GROUP NAME | PRESENCE | RANGE | IE Type and Reference |
|---|---|---|---|
| PSC | M | | 9.2.41 |
| Delta OTD | M | 0 ... 157286399 | |

FIG. 11

HNB UPDATE MESSAGE (HNB CONFIGURATION UPDATE)

| PARAMETER | PRESENCE | RANGE | IE Type and Reference |
|---|---|---|---|
| Message Type | M | | 9.2.1 |
| CHOICE Served Sectors | | | |
| > Complete List | | | |
| >>Complete Served Sectors List | | 1 to maxSectorinHNB | |
| >>> Served Sector Information | M | | 9.2.xx |
| > Delta List | | | |
| >> Served Sectors To Add or Mod | | 0 to maxSectorinHNB | |
| >>> Served Sector Information | M | | 9.2.xx |
| >> Served Sectors to delete | | 0 to maxSectorinHNB | |
| >>> Cell-ID | M | | 9.2.25 |

9.2.XX SERVED SECTOR INFORMATION

| IE/GROUP NAME | PRESENCE | RANGE | IE Type and Reference |
|---|---|---|---|
| Cell-ID | M | | 9.2.25 |
| PSC | M | | 9.2.41 |
| Neighbour Information | O | 1 to <maxnoofNeighbours> | 9.2.yy |

REGISTRATION OF CELL INFORMATION

DB SEARCH AND CELL IDENTIFICATION

REGISTRATION OF CELL INFORMATION

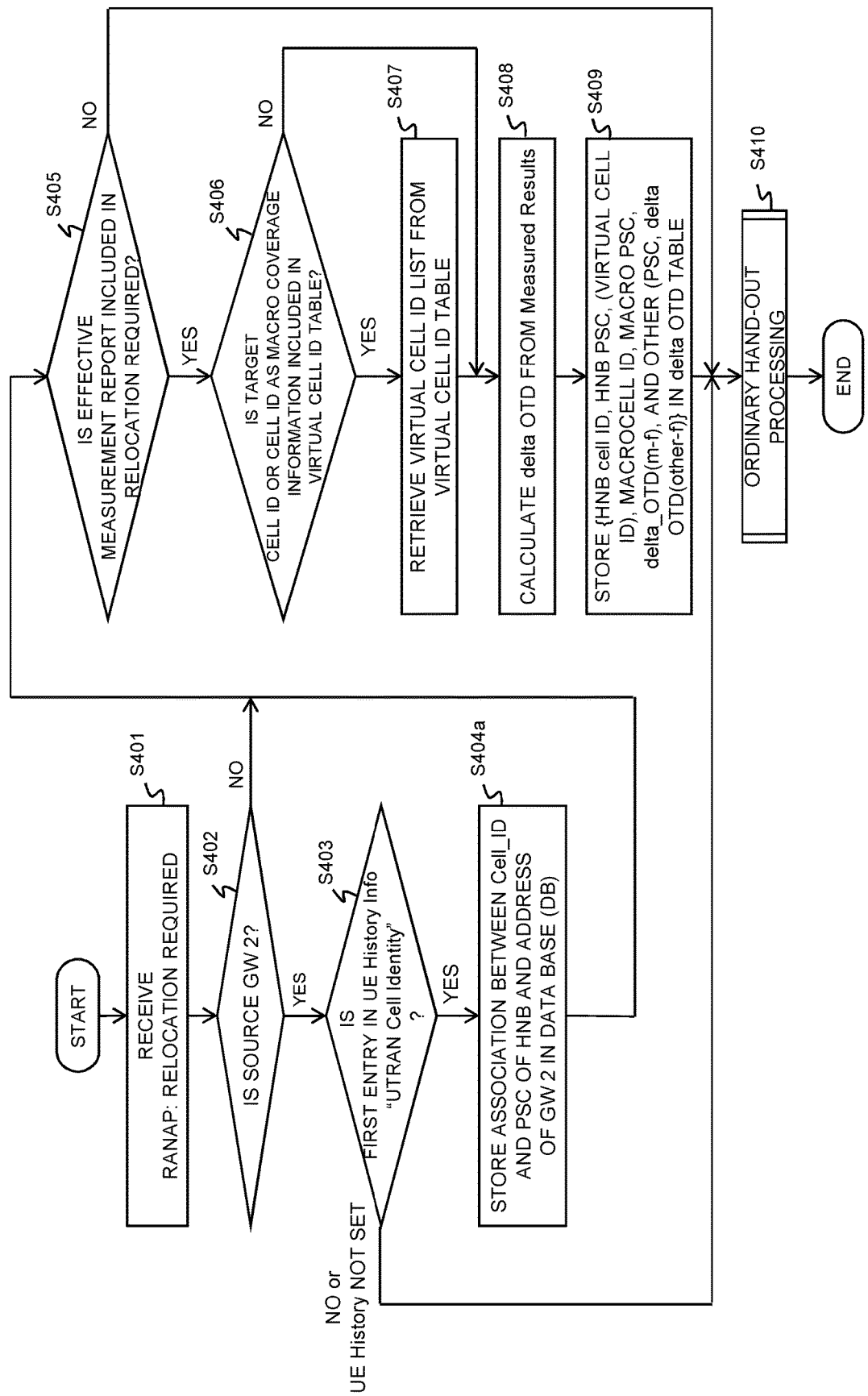

METHOD OF HANDOVER CONTROL, RELAY APPARATUS, AND METHOD FOR SELECTING TARGET CELL IN RADIO COMMUNICATION SYSTEM

CROSS REFERENCE TO RELATED APPLICATIONS

This application is a National Stage of International Application No. PCT/JP2014/003058, filed on Jun. 9, 2014, which claims priority from Japanese Patent Application No. 2013-121564, filed on Jun. 10, 2013, the contents of all of which are incorporated herein by reference in their entirety.

TECHNICAL FIELD

The present invention relates to handover control techniques in radio communication systems and, more particularly, to a method for selecting a handover-target cell at a relay apparatus.

BACKGROUND ART

3GPP (3rd Generation Partnership Project) defines HNB (Home Node B) as a small base station that can be installed inside an office or a user's premises, to allow user equipment (UE) to gain access to an operator network via a HNB. A radio area covered by a single HNB is also referred to as small cell, micro cell, femtocell, picocell, or the like as it has a small range such as the inside of an office or a user's premises. Hereinafter, "femtocell" will be used for convenience, assuming that it includes these cells. In general, such femtocells are configured in large numbers within a macrocell, which covers a wide area.

3GPP defines PSC (Primary Scrambling Code) as a cell's physical cell identification information. Each cell uses a different PSC from one another, whereby a cell can be identified, and an association is made from the PSC to the cell's logical cell identification information (Cell Identity). However, the physical cell identification information is available in limited numbers. For example, a maximum of 512 PSCs are available in UMTS (Universal Mobile Telecommunications System), and a maximum of 504 Pas (Physical Cell Identities) are available in LTE (Long Term Evolution) System. Accordingly, a PSC is used multiple times for femtocells, which are configured in large numbers within a macrocell, and so a unique association cannot be made from a PSC to a Cell Identity, which causes PSC ambiguity. Specifically, in case of a legacy UE prior to 3GPP Release 9, that is, a UE that does not support a function (SI Acquisition function) of acquiring the system information of any cell other than a cell to which the UE is wirelessly connected, the RNC (Radio Network Controller) of a handover-source macro network cannot uniquely determine a target cell that corresponds to a PSC reported from this UE. NPLs 1 and 2 disclose methods (disambiguation) for solving such PSC ambiguity (=PSC confusion).

Hereinafter, methods for PSC disambiguation at a RNC and a HNBGW (HNB gateway) will be described, using a system shown in FIG. 1 as an example.

A) PSC Disambiguation at RNC

According to Annex C.2 (pp. 75-76) of NPL 1, for a first step, a RNC stores necessary information in a database during a process for handing over (handing out) a UE connected to the HNB of a femtocell from the femtocell to a macrocell. Subsequently, for a second step, the information in the database is used when the UE is handed in, whereby a target cell (the femtocell) is identified.

Specifically, in the first step, the UE located in the femtocell sends a Measurement Report to the HNB, and the HNB, when receiving it, sends a handover request message to the RNC via a HNBGW. The RNC stores information of the handover request message in the database and performs learning. This database information includes the logical cell identification information (Cell Identity) of the femtocell and the PSC thereof, the Cell Identity of the macrocell under the RNC's control and the PSC thereof, and the time difference between the reference times of the femtocell and the macrocell measured by the UE (Delta Observed Time Difference: Delta_OTD).

Subsequently, in the second step, the RNC, when receiving a Measurement Report from the UE located in the macrocell, acquires the Cell Identity of the femtocell that is a handover target from the database information and sends a handover request message to the HNB of this femtocell via the HNBGW. The Cell Identity of the femtocell is set in this handover request message, and this Cell Identity is the Cell Identity set in UE History Information in the handover request message sent during hand-out in the first step.

B) PSC Disambiguation at HNBGW

According to Annex C.3 (pp. 76-77) of NPL 1, a method is basically similar to the method for disambiguation at RNC according to C.2, with the difference that the location where the database is stored is the HNBGW.

First, in a first step, a handover request message is sent from the HNB as described above, but the HNBGW, upon receiving the handover request message, constructs database information based on the message and forwards the handover request message to the RNC. The database information includes the logical cell identification information (Cell Identity) of the femtocell and the PSC thereof, the Cell Identity of the macrocell under the RNC's control and the PSC thereof, and delta_OTD information concerning the femtocell and its neighboring macrocell. The delta_OTD represents the time difference between the reference times of the macrocell and the femtocell measured by the UE.

Subsequently, in a second step, the UE sends a Measurement Report to the RNC, and the RNC sends a handover request message including the Measurement Report to the HNBGW. The HNBGW selects the femtocell that is a handover target based on a Cell Identity and the Measurement Report set in UE History Information in the handover request message and on the constructed database information, and sends the handover request message to the HNB of this femtocell.

CITATION LIST

Non-Patent Literature

[NPL 1]
3GPP TS 25.467 V11.1.0 (2012-12) UTRAN Architecture for 3G Home Node B (HNB) Stage 2 (Release 11), relevant part: Annex C
[NPL 2]
3GPP TR 37.803 V11.1.0 (2012-12) Universal Mobile telecommunications System (UMTS) and LTE; Mobility enhancements for Home Node B (HNB) and Home enhanced Node B (HeNB) (Release 11), relevant part: Chapter 6.1.3, Legacy UE Mobility

SUMMARY OF INVENTION

Technical Problem

However, the above described methods A and B for PSC disambiguation are applicable in the case where a HNB registered with a HNBGW includes one cell as shown in FIG. 1. In the case of architecture as shown in FIG. 2 in which a HNBGWb is registered with a HNBGWa and multiple HNBs (HNBb1 and HNBb2) are further connected to the HNBGWb under the HNBGWb's control, there may be some cases where a handover-target cell cannot be identified, which will be described below.

If the method A for PSC disambiguation at RNC is applied to the system shown in FIG. 2, in the first step where the RNC constructs a database, a Cell Identity set in UE History Information in a handover request message at the time of hand-out is the Cell Identity of the HNBGWb or the Cell Identity of the HNBb2.

A.1) In case where the Cell Identity of the HNBGWb is set in UE History Information, the HNBGWa can identify the Cell Identity of the HNBGWb but cannot identify which HNB under the HNBGWb's control is a handover-target cell.

A.2) In case where the Cell Identity of the HNBb2 is set in UE History Information, the HNBGWa, even if seeing the Cell Identity of the HNBb2, does not know to which HNB, or whether to the HNBGWb, it should send a handover request message because the HNBGWa only knows the Cell Identity of the HNBGWb but does not know the Cell Identities of HNBs under its control.

As described above, with the database information at the RNC constructed through a hand-out, it is impossible to accomplish a hand-in to a femtocell under the HNBGWb's control as shown in FIG. 2.

If the method B for PSC disambiguation at HNBGW is applied to the system shown in FIG. 2, in the first step where a database is constructed, a Cell Identity set in UE History Information in a handover request message at the time of hand-out is the Cell Identity of the HNBGWb or the Cell Identity of the HNBb2.

B.1) In case where the Cell Identity of the HNBGWb is set in UE History Information, the HNBGWa cannot find which HNB under the HNBGWb's control an hand-out is made from and therefore cannot identify the PSC of the HNBb2 cell, and consequently the OTD of the HNBb2 cell cannot be identified from a Measured Result sent from the UE. Accordingly, it is impossible to calculate a delta_OTD concerning the femtocell of the HNBb2 and the macrocell under the RNC's control.

B.2) In case where the Cell Identity of the HNBb2 is set in UE History Information, the HNBGWa only has the Cell Identity of the HNBb2 as information and does not know the PSC of the HNBb2. Accordingly, the OTD of the HNBb2 cell cannot be identified from a Measured Result. As a result, it is impossible to calculate a delta_OTD concerning the femtocell of the HNBb2 and the macrocell under the RNC's control.

Accordingly, even if the HNBGWa refers to the database information based on a handover request message received in the second step, the HNBGWa cannot acquire information with which the HNBGWb and HNBb2 can be identified. That is, with the database information at the HNBGWa constructed through a hand-out, it is impossible to accomplish a hand-in to a femtocell under the HNBGWb's control shown in FIG. 2.

As described above, the methods for PSC disambiguation as described in NPLs 1 and 2 are practical only in an architecture in which a base station connected to a HNBGW has one cell as shown in FIG. 1. In network topologies with multi-stage HNBGW-HNB structures as shown in FIG. 2, there are some cases where a target cell cannot be identified in hand-in phase.

Accordingly, an object of the present invention is to provide a method of handover control, a relay apparatus, and a method for selecting a target cell that make it possible to identify a target cell in hand-in phase even in a network topology in which relay apparatuses are connected in multiple stages.

Solution to Problem

A method of handover control according to the present invention is a method of handover control in a radio communication system in which a base station controller and a first relay apparatus are connected to a communication network, wherein the base station controller has under its control at least one first base station connected thereto, and the first relay apparatus has under its control at least a second relay apparatus connected thereto, wherein the second relay apparatus has under its control at least one second base station connected thereto, characterized in that: the first relay apparatus acquires cell information of a cell controlled by the second base station under the control of the second relay apparatus; and, in a hand-in phase for handover from the first base station, to which a radio station is wirelessly connected, to the second base station, the first relay apparatus identifies a target cell of the handover by using the cell information.

A relay apparatus according to the present invention is a relay apparatus that is connected to a communication network to which a base station controller is connected, and has under its own control at least a lower-level relay apparatus connected thereto, wherein the base station controller has under its control at least one first base station connected thereto, and the lower-level relay apparatus has under its control at least one second base station connected thereto, characterized by comprising: storage means for storing cell information of a cell controlled by the second base station under the control of the lower-level relay apparatus; and control means that, in a hand-in phase for handover from the first base station, to which a radio station is wirelessly connected, to the second base station, identifies a target cell of the handover by using the cell information.

A method for selecting a target cell according to the present invention is a method for selecting a target cell at a first relay apparatus in a radio communication system in which a base station controller and the first relay apparatus are connected to a communication network, wherein the base station controller has under its control at least one first base station connected thereto, and the first relay apparatus has under its control at least a second relay apparatus connected thereto, wherein the second relay apparatus has under its control at least one second base station connected thereto, characterized in that: storage means stores cell information of a cell controlled by the second base station under the control of the second relay apparatus; and, in a hand-in phase for handover from the first base station, to which a radio station is wirelessly connected, to the second base station, control means identifies a target cell of the handover by using the cell information.

A radio communication system according to the present invention is a radio communication system in which a base station controller and a first relay apparatus are connected to a communication network, wherein the base station controller has under its control at least one first base station connected thereto, and the first relay apparatus has under its control at least a second relay apparatus connected thereto, wherein the second relay apparatus has under its control at least one second base station connected thereto, characterized in that the first relay apparatus acquires cell information of a cell controlled by the second base station under the control of the second relay apparatus, and in a hand-in phase for handover from the first base station, to which a radio station is wirelessly connected, to the second base station, the first relay apparatus identifies a target cell of the handover by using the cell information.

Advantageous Effects of Invention

According to the present invention, a first relay apparatus acquires the cell information of a second base station under a second relay apparatus's control and uses the acquired cell information in hand-in phase to the second base station's cell, whereby it is possible to identify a target cell that is connected under the second relay apparatus's control on the target cell side.

BRIEF DESCRIPTION OF DRAWINGS

FIG. 6 is a sequence diagram showing handover control operations in the radio communication system according to the present exemplary embodiment.

FIG. 7 is a schematic diagram showing an example of information stored in a database in the present exemplary embodiment.

FIG. 9 is a sequence diagram showing a method for selecting a handover-target cell according to a first example of the present invention.

FIG. 10 is a schematic diagram for describing a format of a HNB register request message in the first example.

FIG. 11 is a schematic diagram for describing a format of a HNB configuration update message in the first example.

FIG. 20 is a flowchart showing cell information registration operations at the time of hand-out in the second example.

DESCRIPTION OF EMBODIMENTS

In a network to which an exemplary embodiment of the present invention is applied, it is assumed that a base station controller connected to the network has under its control a plurality of first base stations connected thereto, that a first relay apparatus connected to the same network has under its control a base station and a second relay apparatus connect thereto, and that the second relay apparatus further has under its control a plurality of second base stations connected thereto. In the network with such a multi-stage structure, a hand-in of a radio station from the first base station under the base station controller's control to a second base station under the second relay apparatus's control is performed as follows. First, the first relay apparatus acquires cell information concerning the second base stations under the second relay apparatus's control. Then, the first relay apparatus, when receiving a handover request for hand-in of the radio station to the cell of a second base station, uses the registered cell information and thereby can identify the second base station (the target cell), which is connected under the second relay apparatus's control on the target cell side. Hereinafter, an exemplary embodiment and examples of the present invention will be described in detail.

1. Exemplary Embodiment 1.1) System Architecture

Figure 1:
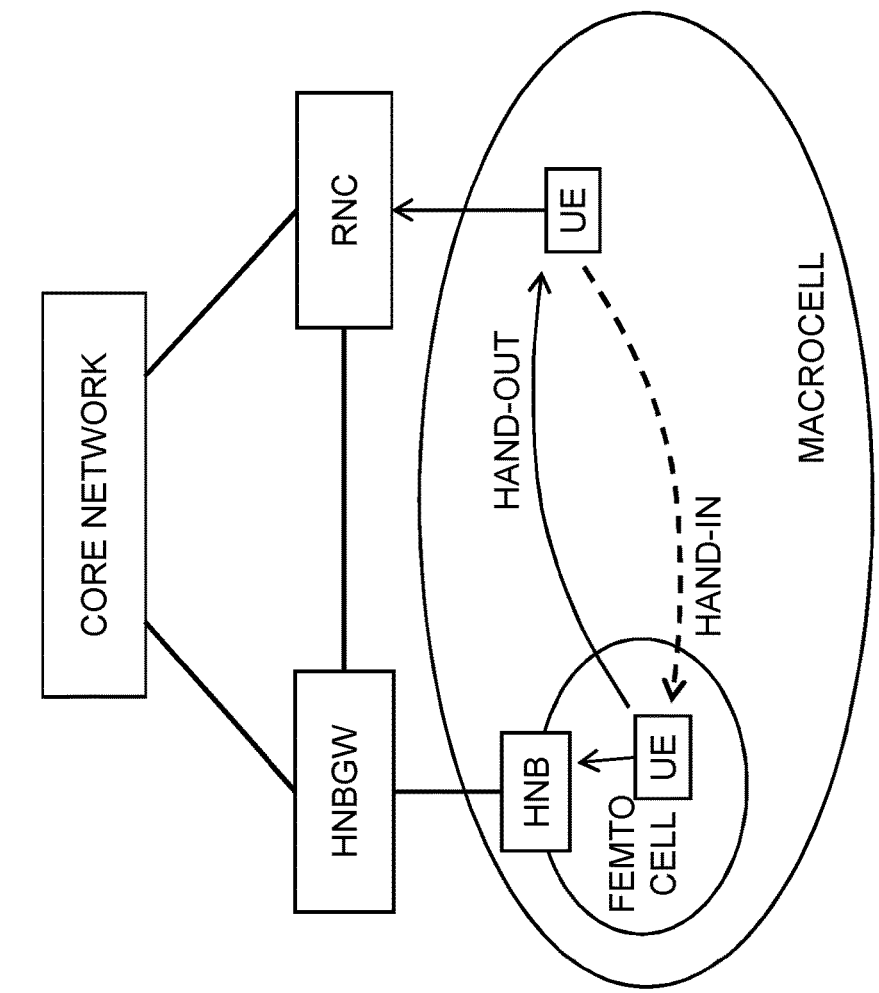
FIG. 1 is an architecture diagram showing a system architecture for describing a background art.
Figure 2:
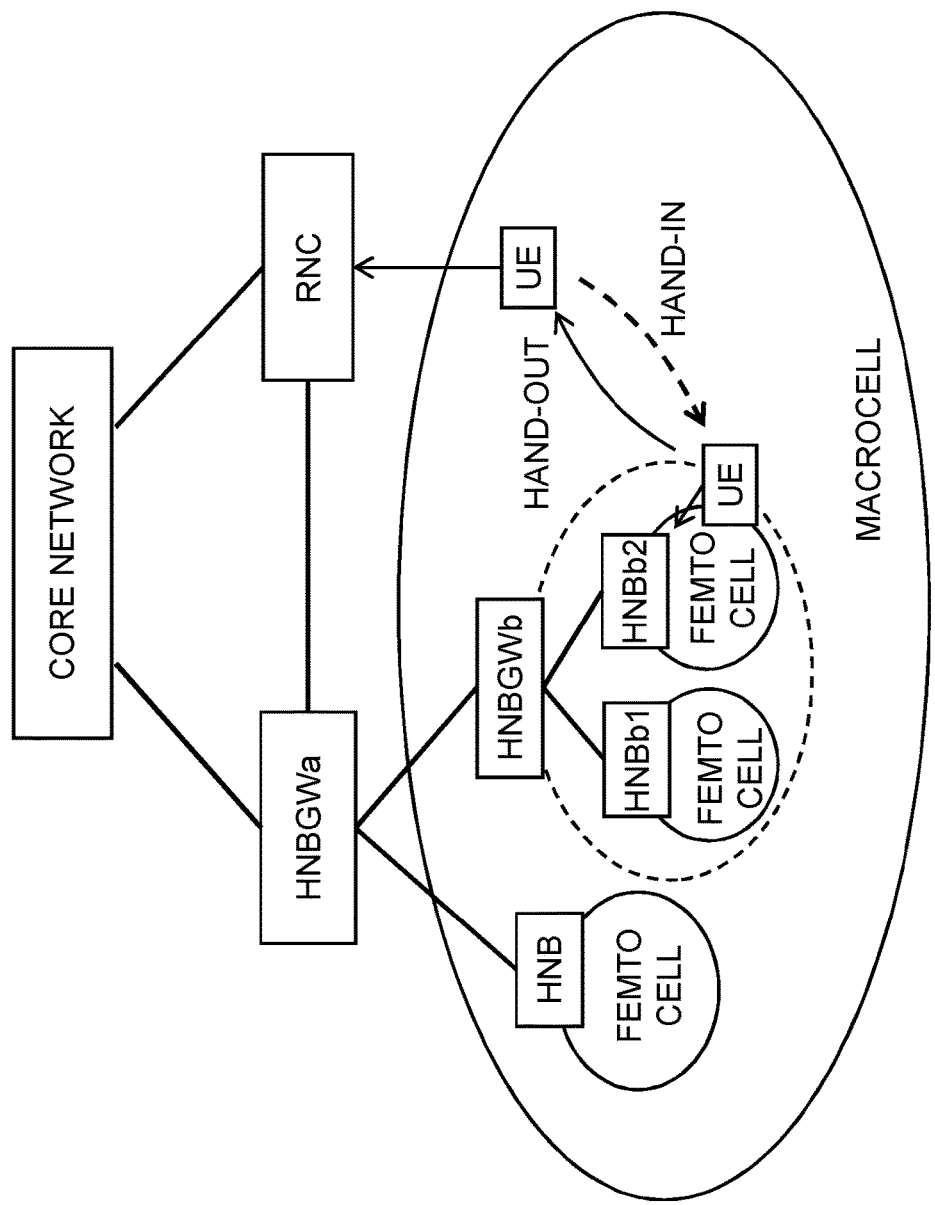
FIG. 2 is an architecture diagram showing a system architecture for describing problems with the background art.
Figure 3:
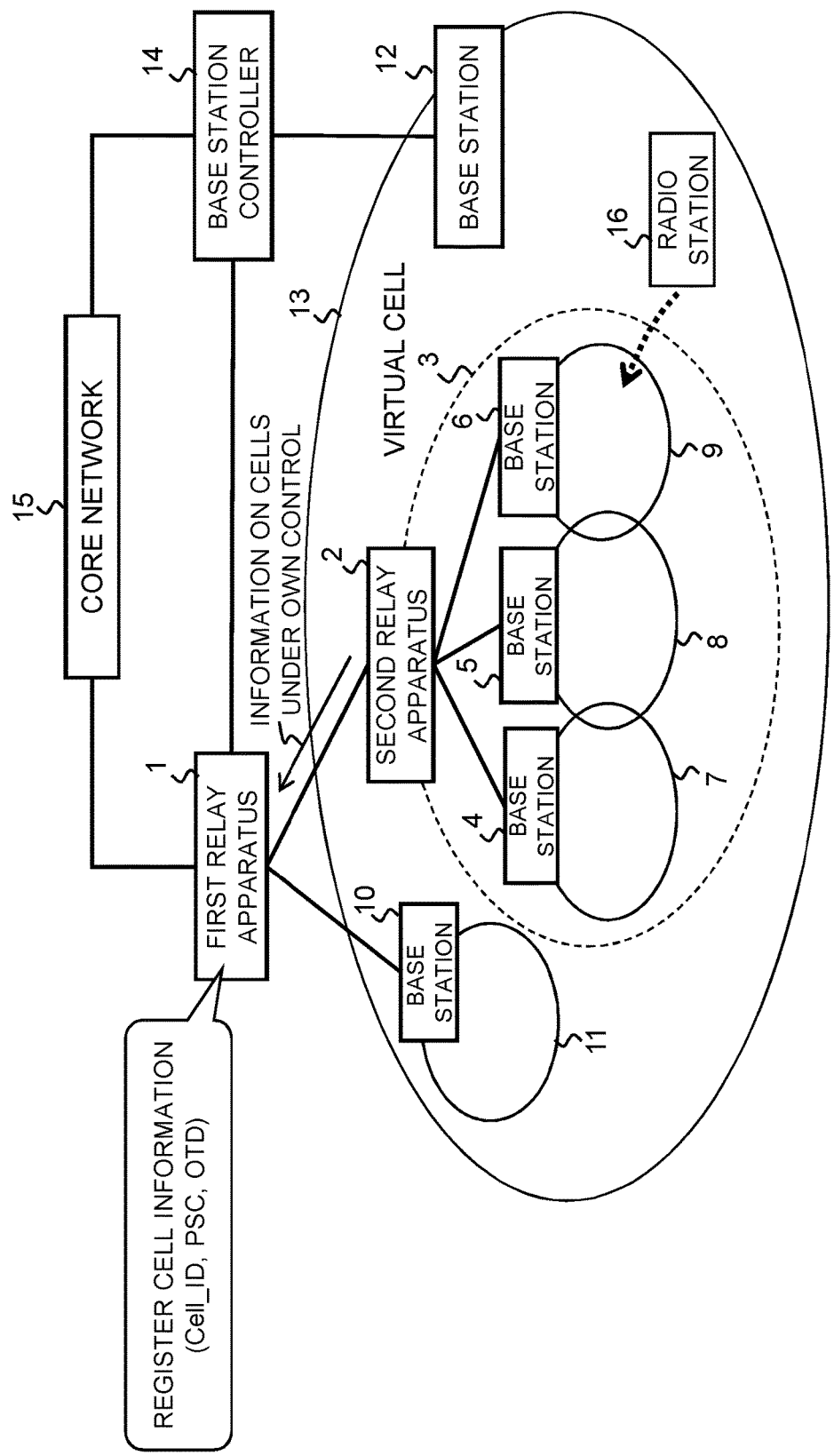
FIG. 3 is an architecture diagram showing an example of the architecture of a radio communication system according to an exemplary embodiment of the present invention.

FIG. 3 shows an example of a multi-stage network topology to which a radio communication system according to an exemplary embodiment of the present invention is applied. However, to avoid complexity of a description, it is assumed that one base station 10 and one relay apparatus (second relay apparatus 2) are connected to one relay apparatus (first relay apparatus 1) under the control thereof. The topology is not limited to this, but a plurality of base stations and a plurality of relay apparatuses may be connected to the first relay apparatus 1 under the control thereof. A topology is also possible in which no base station is provided under the control of the first relay apparatus 1.

Referring to FIG. 3, the base station 10 controls a cell 11, and the second relay apparatus 2 has under its control a plurality of base stations (here, three base stations 4 to 6) connected thereto, wherein the base stations 4 to 6 control cells 7 to 9, respectively.

It is assumed that the first relay apparatus 1 is connected to a base station controller 14 and a core network 15, and that a base station 12 connected to the base station controller 14 controls a cell 13. It is assumed that the cell 13 is a cell covering a wide area, and that the cells 7 to 9 and 11 neighbor to the cell 13. For example, the cell 13 is a macrocell, and the cells 7 to 9 and 11 are femtocells neighboring to the macrocell 13. Moreover, a radio station 16 is a mobile station, user equipment, mobile terminal, or the like that can move between cells.

Note that in FIG. 3, the cells 7 to 9 under the control of the second relay apparatus 2, when viewed from the base station controller 14, are treated as a single virtual cell 3 formed by the second relay apparatus 2. A virtual cell is a cell as a unit of management from the viewpoint of the base station controller 14 or first relay apparatus 1, and refers to a cell created by virtually regarding as a single cell a plurality of cells that are controlled by a plurality of base stations, or by the first relay apparatus 1 or second relay apparatus 2, within a cell managed by the base station controller 14. Accordingly, not only the virtual cell 3, but a collection of the cells 7 to 9 with an addition of the cell 11 can also be treated as a single virtual cell when they are viewed from the base station controller 14.

According to the present exemplary embodiment, the cell information of the cells 7 to 9 under the control of the second relay apparatus 2 is registered in a database at the first relay apparatus 1 through any method. When the radio station 16 that is wirelessly connected to the base station 12 of the cell 13 is handed in to the cell 9 from the cell 13, the first relay apparatus 1, when receiving a request for this handover from the base station controller 14, refers to the cell information registered in the database, whereby the first relay apparatus 1 can find that the target cell of this handover is the cell 9 under the control of the second relay apparatus 2, and can send the handover request to the base station 6 via the second relay apparatus 2.

1.2) Configuration of Relay Apparatus

Figure 4:
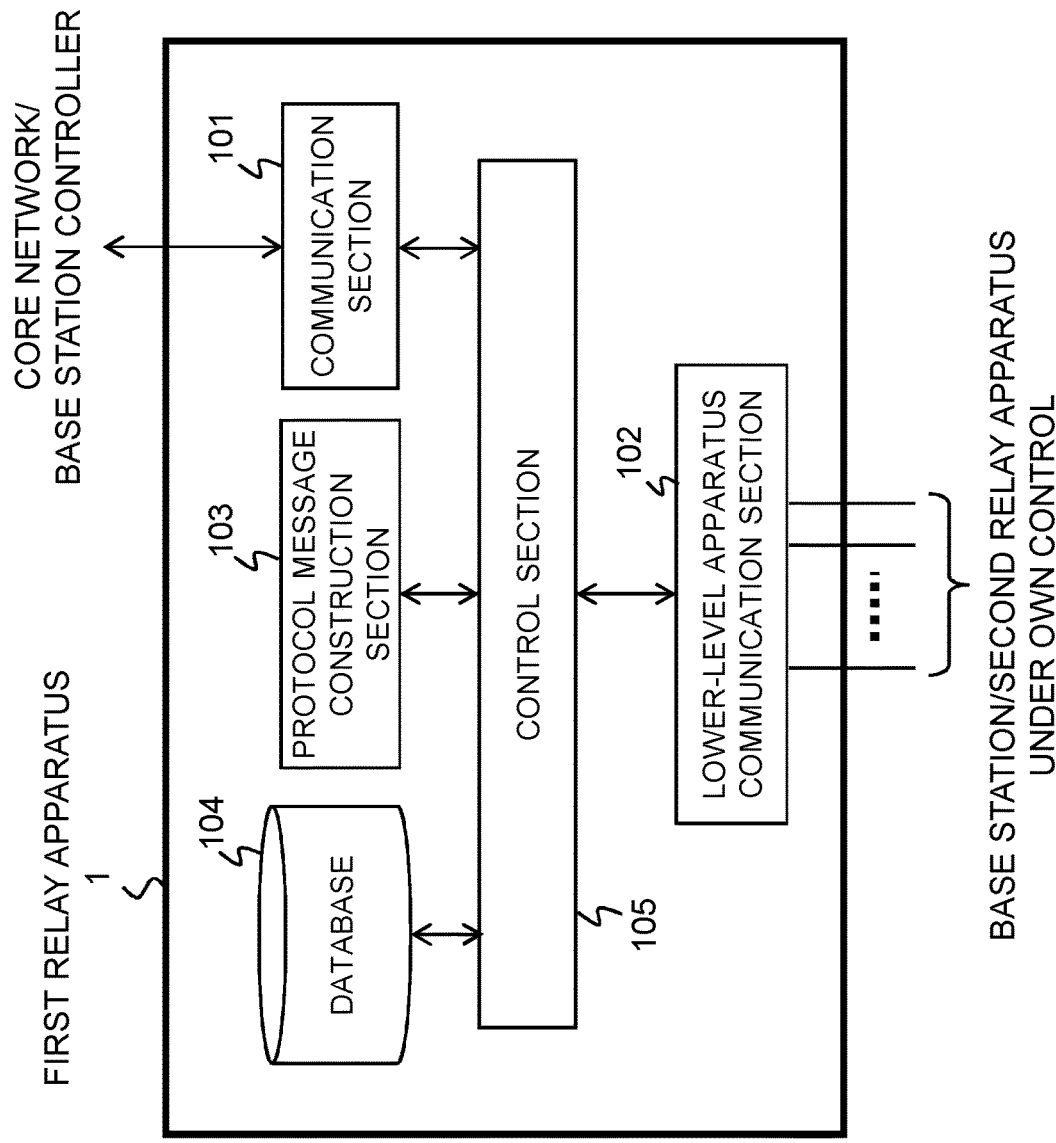
FIG. 4 is a block diagram showing a schematic configuration of a first relay apparatus in the present exemplary embodiment.

Referring to FIG. 4, the first relay apparatus 1 includes a communication section 101, a lower-level apparatus communication section 102, a protocol message construction section 103, a database 104, and a control section 105.

The first relay apparatus 1 can exchange messages with the base station controller 14 and core network 15 via the communication section 101 and can exchange messages with the base station and second relay apparatus under its control via the lower-level apparatus communication section 102.

The protocol message construction section 103 constructs and analyzes protocol messages exchanged with the base station controller 14 and core network 15, as well as the base station 10 and second relay apparatus 2 under its control. Specific examples of the protocol messages will be described in examples, which will be described later.

The database 104 stores and manages the following information: 1) a registration table in which an association is made from cell identification information (Cell Identity) between the PSC of this cell and the address of the base station forming this cell or the address of the second relay apparatus 2; 2) information on cells neighboring to the base station or second relay apparatus 2; 3) virtual cell identification information (Cell Identity) for mapping from the cell 13 to a virtual cell (Cell Identity); and 4) a delta_OTD table. As to the information 3) of them, information on mapping from the cell 13 to a virtual cell (Cell Identity) is manually given by an operator as an O&M system parameter of the first relay apparatus 1. Moreover, the virtual cell identification information (Cell Identity) is a Cell Identity that can be set as a handover target (Target Cell Identity) in a handover table at the base station controller 14 when the PSC of a handover-target cell in a Measurement Report that the base station controller 14 receives from a UE indicates the cell of the base station or second relay apparatus under the control of the first relay apparatus 1, or of a base station under the control of the second relay apparatus. In registration of a base station, which will be described later, when the first relay apparatus 1 receives a base station register request message from the base station or second relay apparatus 2 under its control via the lower-level apparatus communication section 102, information included in this message is registered in the database 104. Note that the details of the database 104 will be described later (see FIG. 7).

The control section 105 controls operations of the first relay apparatus 1 and performs operations for database information construction, protocol processing, handover request message routing, and the like, which will be described later. Note that functions equivalent to the protocol message construction section 103 and control section 105 can also be implemented by executing programs stored in a memory (not shown) on a computer (processor).

Figure 5:
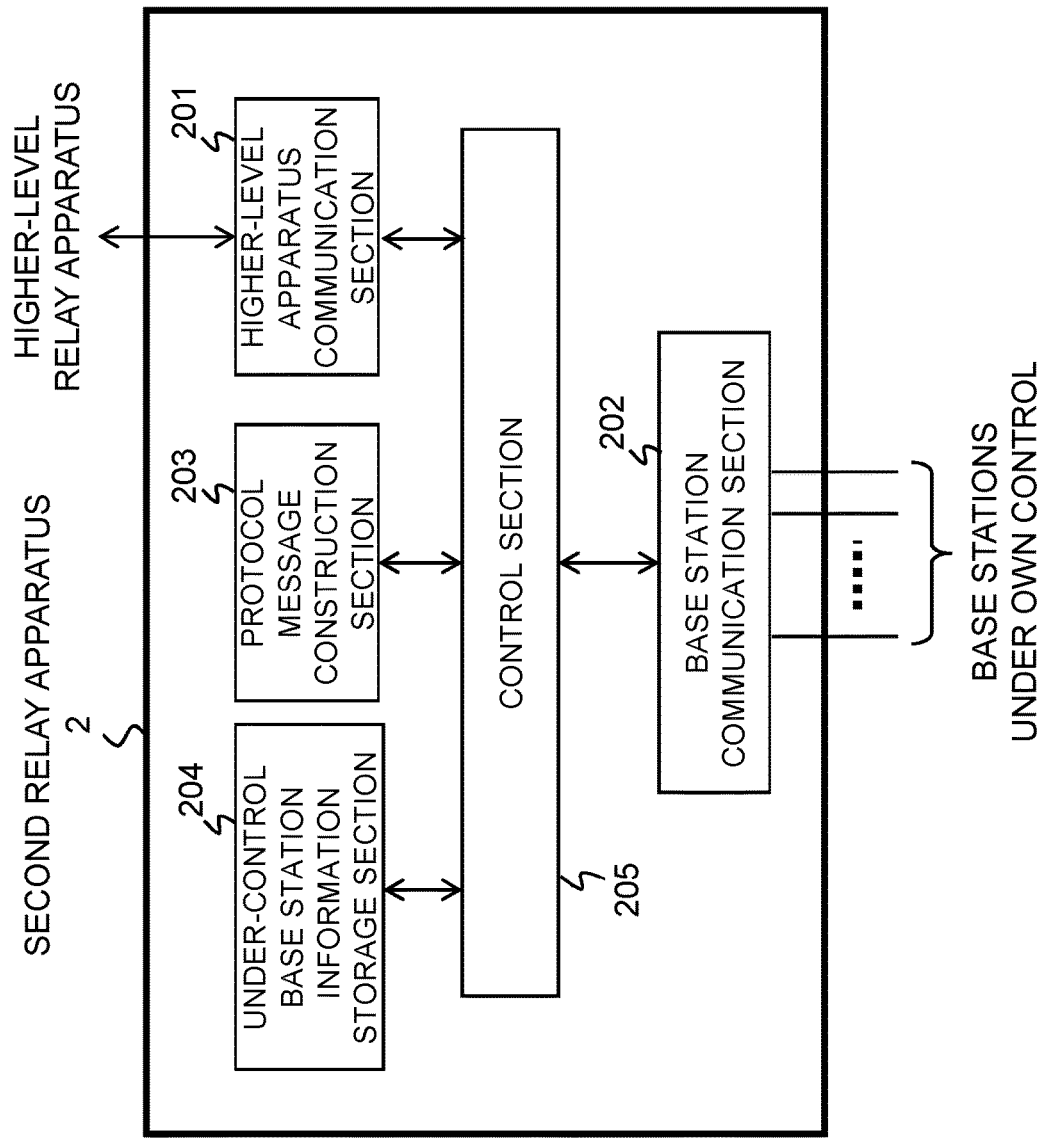
FIG. 5 is a block diagram showing a schematic configuration of a second relay apparatus in the present exemplary embodiment.

Referring to FIG. 5, the second relay apparatus 2 includes a higher-level apparatus communication section 201, a base station communication section 202, a protocol message construction section 203, an under-control base station information storage section 204, and a control section 205, and exchanges protocol messages with a higher-level relay apparatus, base stations under its own control, and UEs.

The second relay apparatus 2 exchanges messages with the first relay apparatus 1 via the higher-level apparatus communication section 201, and receives measurement reports from and sends protocol messages to the base stations under its own control via the base station communication section 202.

The protocol message construction section 203 constructs and analyzes protocol messages exchanged with the first relay apparatus 1 and the base stations under its own control. Specific examples of the protocol messages will be described in examples, which will be described later.

The under-control base station information storage section 204 stores the base station information (cell information) of the base stations 4 to 6 under the control of this second relay apparatus 2. The cell information includes cell identification information, PSC, address, neighboring cell information, and the like.

The control section 205 controls operations of the second relay apparatus 2 and performs operations for cell information notification processing, handover request message routing, and the like, which will be described later. Note that functions equivalent to the protocol message construction section 203 and control section 205 can also be implemented by executing programs stored in a memory (not shown) on a computer (processor).

1.3) Handover Control

Handover control according to the present exemplary embodiment is divided into operations for registration/update of cell information and operations for selection of a handover-target cell after a measurement report is received from a terminal, as shown in FIG. 6.

<Registration/Update of Cell Information>

Referring to FIG. 6, the control section 205 of the second relay apparatus 2 reads the cell information of the base stations 4 to 6 (cells 7 to 9) under its control from the under-control base station information storage section 204, and the protocol message construction section 203 constructs a cell information notification message, which is then sent to the first relay apparatus 1 via the higher-level apparatus communication section 201 (Operation S20). Any methods will do to notify the cell information, including a method using a register request/update message, a method using a protocol message in hand-out phase, and the like, which will be described later.

The control section 105 of the first relay apparatus 1, when receiving the cell information notification message via the lower-level apparatus communication section 102, extracts the cell information from this received message and registers in the database 104 information concerning the cells under the controls of the base station and the second relay apparatus 2 in a predetermined table format (Operation S21). The control section 105 can update the information registered in the database 104 each time cell information is notified from the second relay apparatus 2.

<Selection of Handover-Target Cell>

Referring to FIG. 6, the base station controller 14, when receiving a measurement report from a UE located in the cell 13 (Operation S22), identifies target cell identification information and a destination from this measurement report and sends a handover request message including information concerning the cell 13, which is the handover-source cell, and the measurement report information to the first relay apparatus 1 (Operation S23).

When the first relay apparatus 1 receives the handover request message via the communication section 101, the control section 105 searches the database 104 using the cell information such as the target cell identification information and source cell identification information included in the handover request message, and identifies the second relay apparatus 2 and the target cell 9 to which the handover request message is to be forwarded (Operation S24).

When a route up to the target cell 9 is thus identified, the control section 105 sends the handover request message to the base station 6 of the target cell 9 via the lower-level apparatus communication section 102 (Operation S25), and then processing for hand-in from the source cell 13 to the target cell 9 is performed (Operation S26).

1.4) Database Information

The database 104 provided to the first relay apparatus 1 stores, as an example, a base station registration table, a virtual cell ID table, and a cell information and time difference table, as shown in FIG. 7.

The base station registration table is a table that is constructed based on a register request/update message or a handover request message received from the base station or relay apparatus under the control of the first relay apparatus 1, by registering cell identification information, a PSC, and an address included in the message. In the network of the present exemplary embodiment shown in FIG. 3, for example, with respect to the base station 10, the Cell Identity and PSC of its cell 11 and the address of the base station 10 are registered as one record. Moreover, with respect to the second relay apparatus 2, the Cell Identity and PSC of the virtual cell and the address of the second relay apparatus 2 are not registered. Moreover, with respect to the base stations 4 to 6 under the control of the second relay apparatus 2, individually, the respective Cell Identities and PSCs of the cells 7 to 9 and the address of the second relay apparatus 2 are registered.

The virtual cell ID table is a table that is constructed based on a register request/update message or a handover request message received from the base station or relay apparatus under the control of the first relay apparatus 1, by registering mapping between a macrocell neighboring to base stations under the control of the first relay apparatus 1 or second relay apparatus 2 and a virtual cell viewed from the macrocell, which corresponds to the plurality of base stations under the control of the first relay apparatus 1 or second relay apparatus 2. One macrocell may be mapped to a plurality of virtual cells, or a plurality of macrocells may be mapped to a single virtual cell. In the network of the present exemplary embodiment shown in FIG. 3, since one virtual cell 3 exists within the macrocell 13, mapping is made from the mCell_ID of the macrocell 13 to the vCell_ID of the virtual cell 3.

The cell information and time difference table is constructed by using a register request/update message or a handover request message received from the base station or relay apparatus under the control of the first relay apparatus 1 and also the above-described base station registration table and virtual cell ID table, and includes, with respect to each femtocell, information (identification information and PSC) on this femtocell and a macrocell, a delta_OTD with respect to the macrocell (the time difference in reference time between the macrocell and the femtocell), and a list of delta_OTDs with respect to other cells (additional information). Note that a specific method for calculating a delta_OTD will be described in examples.

1.5) Effects

As described above, according to the present exemplary embodiment, cell information including cell identification information, PSC information, and address information concerning the cells 7 to 9 under the control of the second relay apparatus 2, or cell information also including, in addition to these information, OTD information, information indicating relations with neighboring cells, and the like is registered in a database at the higher-level first relay apparatus 1. When the radio station 16 that is wirelessly connected to the base station 12 of the cell 13 is handed in to the cell 9 from the cell 13, the first relay apparatus 1, when receiving a request for this handover from the base station controller 14, refers to the cell information registered in the database, whereby, even if a PSC is used multiple times, the first relay apparatus 1 can find that the target cell of this handover is the cell 9 under the control of the second relay apparatus 2, and can send the handover request to the base station 6 via the second relay apparatus 2.

2. Radio Communication System

Hereinafter, examples of the present invention will be described in detail by using a radio communication system shown in FIG. 8 as an example. It is assumed that the radio communication system shown in FIG. 8 has a network topology corresponding to that of the system shown in FIG. 3. Corresponding apparatuses are given the same reference numbers, and a detailed description of each apparatus will be omitted.

Correspondences between components in FIG. 8 and components in FIG. 3 are as follows. GWs (gateways) 1 and 2 in FIG. 8 correspond to the first relay apparatus 1 and second relay apparatus 2, respectively; HNBs (Home NodeBs) 4 to 6 and 10, the base stations 4 to 6 and 10, respectively; the base station 12, a NodeB 12; the base station controller 14, a RNC (Radio Network Controller) 14; and a UE 16, the radio station 16. Moreover, a macrocell 13 corresponds to the cell 13, and the cells 7 to 9 and 11 correspond to femtocells 7 to 9 and 11, respectively. The GW 1 can have under its control a plurality of HNBs and a plurality of GWs connected thereto as described already. It is only to avoid complexity of the drawing that FIG. 8 shows one HNB and one GW. It is also possible that only one or more GWs are connected, without any HNB being connected.

Figure 8:
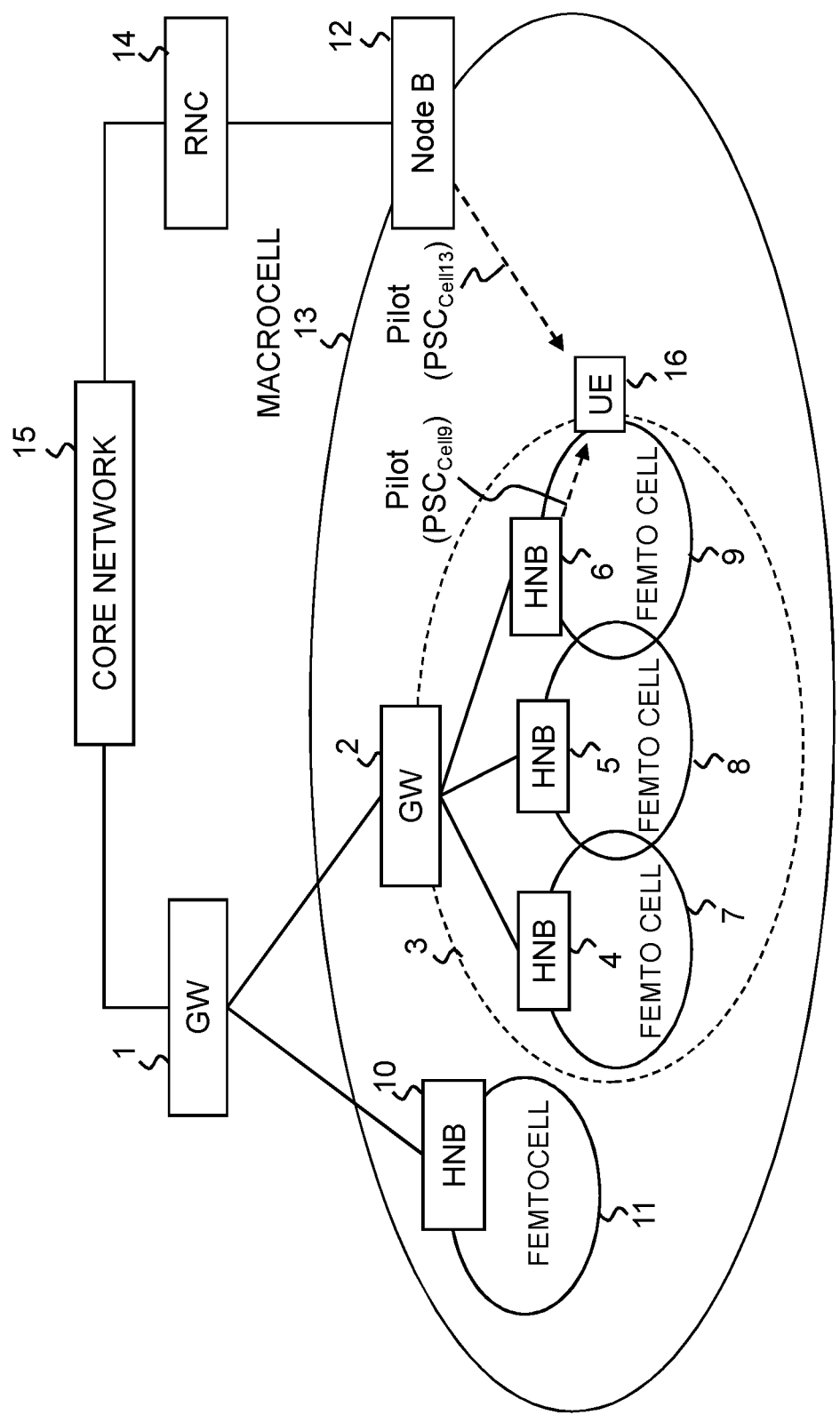
FIG. 8 is an architecture diagram showing an example of the architecture of a radio communication system for describing an example of the present invention.

Referring to FIG. 8, the radio communication system includes the NodeB 12, which is a public radio base station generally covering a wide area, and the RNC 14, which controls a plurality of NodeBs. The NodeB 12 forms the macrocell 13 as a communication area. The RNC 14, which controls the NodeB 12, connects to a core network 15, which includes a MSC (Mobile Switching Center), a SGSN (Serving GPRS Support Node), and the like, and thus can connect to the GW 1, which will be described later.

The HNBs 4 to 6 and 10 are small radio base stations, each, as a single node, generally covering a small area. Places where a HNB is installed includes not only ordinary houses but also condominiums, commercial buildings, shopping malls, street lights in downtowns, and the like, and a wide communication area can be formed by one or a plurality of HNBs.

The GW 2 is a gateway apparatus that is capable of being directly connected from a plurality of HNBs, and relays between a HNB system including the plurality of HNBs 4 to 6 and the GW 1. To the GW1, the GW 2 functions as a single HNB similar to the HNB 10. In other words, cell identification information (Cell Identity) assigned to the GW 2 is virtually regarded as that of a single cell (virtual cell 3), despite the fact that the cells 7 to 9 formed by the HNBs 4 to 6, respectively, exist under the control of the GW 2.

The UE 16 can be handed over between cells, while receiving reference signals (pilot signals) from cells in its neighborhood. Hereinafter, a detailed description will be given of operations for handover between the macrocell 13 and the femtocell 9. Note that in hand-out phase, the femtocell 9 is the source cell and the macrocell 13 is the target cell, and in hand-in phase, the macrocell 13 is the source cell and the femtocell 9 is the target cell.

The GW 1 stores HNB identification information (ID), cell identification information (Cell Identity), and PSC information, each of which is assigned by one piece of information to each HNB. The HNB 10 forms the only one cell 11, to which a PSC value different from those of its neighboring cells is assigned. Similarly, the GW 1 stores HNB identification information (ID), cell identification information (Cell Identity), and PSC information, each assigned by one piece of information to the GW 2. However, a PSC assigned to the GW 2 does not necessarily need to be the same as the PSC values of the cells 7 to 9 of the HNB 4 to 6 under its control, and the GW 2 does not need to store PSC information.

Moreover, it is also possible that when registering a HNB or a GW 2, the GW 1 determines whether an apparatus under its control is a HNB or is a GW, based on HNB identification information and cell identification information, which are included in a message received from the apparatus under its control.

The GW 2 can connect to a plurality of HNBs (4, 5 and 6) and stores cell identification information and PSC information, each assigned by one piece of information to each of these HNBs under its control. The same PSC value can be used, but in general different PSC values are assigned to cells neighboring to each other in order for the UE 16 to identify a cell. The GW 2 can collectively treat the cells 7, 8 and 9 as if they are the single virtual cell 3. In registration with the GW 1, the identification information of the virtual cell 3 is set in a GW 2 registration message (see 3GPP TS 25.469 V11.1.0 (2012-12), UTRAN Iuh interface Home Node B (HNB) Application Part (HNBAP) signalling (Release 11)). However, since PSC is an optional parameter that is not necessarily always set, the GW 2 does not need to set the PSC information of the virtual cell 3 in the GW 2 registration message.

Moreover, the RNC 14 can connect to not only the single NodeB 12 but also a plurality of NodeBs. It is also possible that the cell 13 formed by the NodeB 12, which is larger than the cells 7, 8, 9, and 11, includes part or all of them. Furthermore, although the RNC 14 is connected to the GW 1 via the core network 15, this does not represent a limit, and the RNC 14 may be directly connected to the GW 1.

3. First Example

According to a first example of the present invention, database information at the GW 1 is constructed by using cell information included in a HNB register request/update message received from the GW 2.

<Registration/Update of Cell Information>

Referring to FIG. 9, the control section 205 of the GW 2 reads from the under-control base station information storage section 204 cell information including the cell identification information of the HNBs 4 to 6 (cells 7 to 9) under its control, the PSCs thereof, and information (PSC, delta_OTD, and the like) concerning their neighboring cells, and the protocol message construction section 203 constructs a HNB registration message (HNB REGISTER REQUEST), which is then sent to the GW 1 via the higher-level apparatus communication section 201 (Operation S30). The HNB registration message will be described later (see FIG. 10).

The control section 105 of the GW 1, when receiving the HNB registration message via the lower-level apparatus communication section 102, extracts the cell information from this HNB registration message and registers in the database 104 information concerning the cells under the controls of the HNB and GW 2 under its own control in a predetermined table format (Operation S31). The control section 205 of the GW 2 updates the information in the under-control base station information storage section 204 when any change occurs in the structure of the HNB system under its control (addition/reduction of a HNB), Cell Identity, PSC, neighboring macrocell, and neighboring macrocell Delta_OTD information (Operation S32), and the protocol message construction section 203 uses the updated cell information to construct a HNB update message (HNB CONFIGURATION UPDATE), which is then sent to the GW 1 via the higher-order apparatus communication section 201 (Operation S33). Each time such a HNB update message is received from the GW 2, the control section 105 of the GW 1 updates the information registered in the database 104 (Operation S34). The HNB update message will be described later (see FIG. 11).

<Selection of Handover-Target Cell>

Subsequently, the RNC 14, upon receiving a measurement report from the UE 16 located in the cell 13 (Operation S35), identifies target cell identification information and a destination from the measurement report and sends a handover request message, including information concerning the macrocell 13, which is the source cell, and the measurement report information, to the GW 1 (Operation S36).

When the GW 1 receives the handover request message via the communication section 101, the control section 105 searches the database 104 using the cell information such as the target cell identification information and source cell identification information included in the handover request message, thus identifying the GW 2 and the femtocell 9 to which the handover request message is to be forwarded (Operation S37).

When a route up to the target cell 9 is thus identified, the control section 105 sends the handover request message to the HNB 6 of the femtocell 9, which is the target cell, via the lower-level apparatus communication section 102 (Operation S38), and then processing for hand-in from the macrocell 13 to the femtocell 9 is performed (Operation S39).

3.1) HNB Register Request/Update Message

The use of a HNB registration message as a message for sending cell information from the GW 2 to the GW 1 makes it possible to set one or a plurality of combinations of HNB identification information (Cell Identity) and PSC. Further, it is also possible to include information on delta_OTD between each HNB and one or a plurality of its neighboring cells.

Information concerning a plurality of cells under the control of the GW 2 is stored in Local Cell Information of a HNB registration message, as shown in FIG. 10. That is, the cell identification information Cell-ID and PCS of each under-control cell is included in Local Cell Information, whereas information (PSC and delta_OTD) on neighboring cell of each under-control cell is included in Neighbour Information. In the present example, the cell identification information Cell-IDs and PSCs of the plurality of femtocells 7 to 9 are stored in Local Cell Information, and the PSC of and delta_OTD with respect to the neighboring macrocell 13 are stored in Neighbour Information. Further, the information on neighboring cell of each under-control cell in Neighbour Information may include Cell ID, causing precision in the above-described database search (Operation S37 in FIG. 9) to be increased. Moreover, it also becomes possible to acquire a macrocell ID in the above-described registration in the cell information and time difference table in Operation S31/S34.

The GW 2 can learn the delta_OTD between a HNB under its control and the macrocell 13 through neighboring cell measurement or the like by the HNB under its control. At that time, if the delta_OTD has deviated from one initially or previously notified by a predetermined threshold, such a fact may be sent as update information. Note that it is possible to provide an allowance to a delta OTD value for deciding on whether to be identical or not, in consideration of the possibility that a deviation of several chips may occur due to a drift of a cell reference signal, which may be caused depending on radio propagation distance or due to long-time operation. For example, in case of a delta_OTD allowance of 1000 and a delta_OTD value of 10000, it may be determined that the delta_OTD values ranging from 9000 to 11000 indicate a cell having the same delta_OTD information. In this case, the predetermined threshold for comparison preferably has a width equal to or smaller than the delta_OTD allowance.

Moreover, since an allowance is provided to allow delta OTDs to be recognized as the same, it is possible to determine that delta_OTDs indicate the same cell and thus to increase the probability of identifying a target cell, even if deviation occurs in OTD due to a difference in propagation distance caused by different handover locations within a cell and consequently deviation also occurs in delta_OTD information. Furthermore, a similar effect can also be obtained even if some deviation occurs in the timing of cell reference signal transmission due to the long-time operation of a cell.

It is also possible to use a message other than the HNB registration message as a message for sending cell information from the GW 2 to the GW 1. For example, it is also possible that Sector List of all HNBs under the control of the GW 2, Sector List of the additionally connected to the GW 2, Sector List changed, and Sector List deleted are included in Sector Information of a HNB update message, which is then sent, as shown in FIG. 11. Similarly to the registration message, cell identification information Cell-IDs and PSCs are stored in Sector Information, and the PSC of and delta_OTD with respect to the neighboring macrocell 13 are stored in Neighbour Information.

Hereinafter, a description will be given of operations for cell information registration using a HNB registration message (HNB REGISTER REQUEST).

3.2) Cell Information Registration Phase

Figure 12:
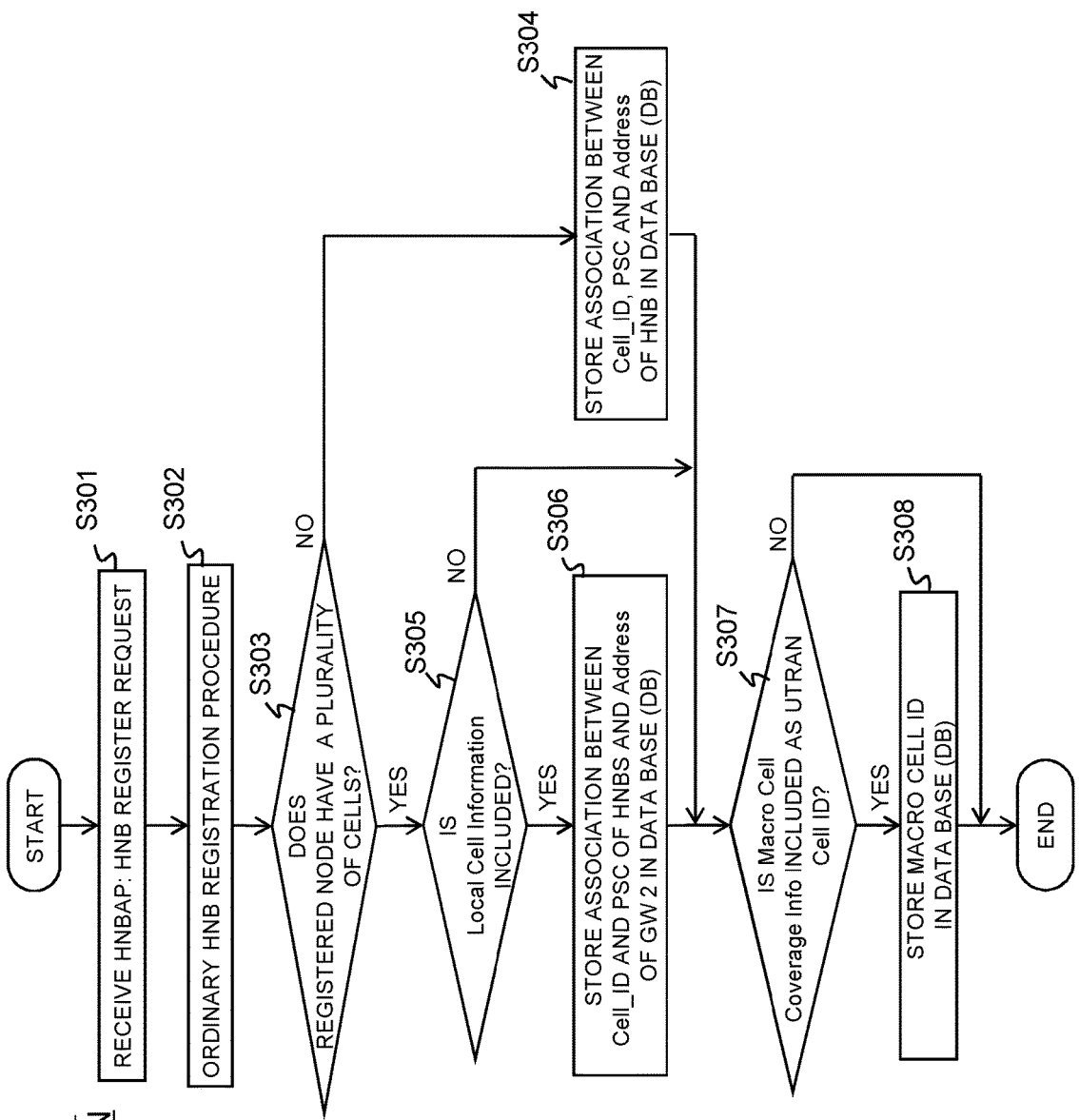
FIG. 12 is a flowchart showing cell information registration operations in the first example.

Referring to FIG. 12, first, it is assumed that the GW 2 sends a HNB REGISTER REQUEST message to the GW 1. The HNB REGISTER REQUEST message mainly includes the following information, as illustrated in FIG. 10:
  HNB ID;
  Cell Identity;
  PSC; and
  Information on neighboring macrocell of a HNB or a HNB under the control of the GW 2.
Other information is not directly relevant to the present example and therefore are omitted.

When the lower-level apparatus communication section 102 of the GW 1 receives the HNB REGISTER REQUEST message (Operation S301), the control section 105 performs an ordinary HNB registration procedure (Operation S302).

Subsequently, the protocol message construction section 103 determines whether the registered node is a HNB having a single cell or is the GW 2 having a plurality of cells (Operation S303). For this identification determination, a parameter of the HNB REGISTER REQUEST message, for example, the source IP address or port number of this received message can be used. In addition to them, identification can be performed, for example, based on character string information included in the HNB ID, cell identification information (Cell Identity), or PSC information.

If the registered node is a HNB having a single femtocell (Operation S303; NO), the control section 105 registers a combination of the Cell Identity, PSC, and Address of the HNB in the base station registration table of the database 104 (Operation S304).

When the registered node is the GW 2 that can have a plurality of femtocells (Operation S303; YES), the protocol message construction section 103 determines whether or not the received HNB REGISTER REQUEST message includes Local Cell Information (Operation S305). If Local Cell Information is included (Operation S305; YES), the control section 105 registers a combination of the Cell Identities and PSCs of HNBs and Address of the GW 2 in the base station registration table of the database 104 (Operation S306). Note that if information on delta_OTD between each HNB and at least one neighboring cell is included, this delta_OTD information may be registered in the cell information and time difference table. Operation S306 is not performed when Local Cell Information is not included (Operation S305; NO) or when the above-described Operation S304 is completed.

Subsequently, the control section 105 determines whether or not a macrocell neighboring to the HNB/GW is set in the received HNB REGISTER REQUEST message (Operation S307). If a macrocell is set (Operation S307; YES), the control section 105 registers information on that neighboring macrocell in the database, in addition to information on the HNB/GW (Operation S308). Thus, table information as illustrated in FIG. 7 can be registered in the database 104.

3.3) Hand-in Phase

Next, operations in hand-in phase for handing over the UE 16 from the macrocell 13 to the femtocell 9 will be described with reference to FIGS. 13 to 15. Note that Operations S35 to S38 shown in FIG. 13 correspond to Operations S35 to S38 shown in FIG. 9, respectively.

Figure 13:
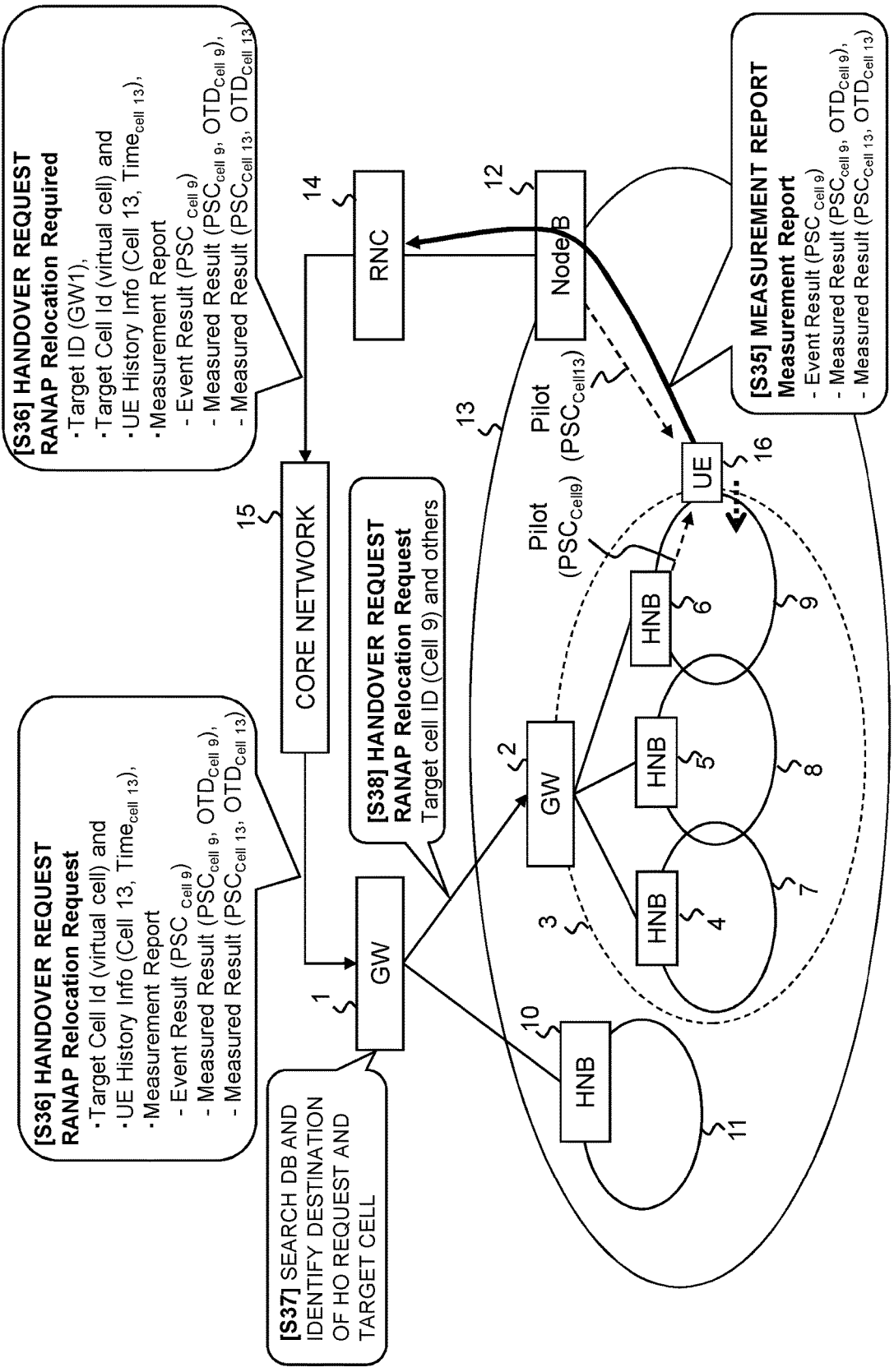
FIG. 13 is a schematic system architecture diagram showing a sequence in hand-in phase in the first example.

Referring to FIG. 13, the UE 16 receives $PSC_{Cell9}$ from a pilot signal of the femtocell 9 and $PSC_{Cell13}$ from a pilot signal of the macrocell 13 while it is wirelessly connected to the NodeB 12 within the macrocell 13. At this time, the UE 16 sends a Measurement Report message to the RNC 14, based on the measured result that pilot received power from the femtocell 9 is larger than that of the macrocell 13 (Operation S35).

The Measurement Report includes Event Result and Measured Result, wherein the $PSC_{Cell9}$ of the femtocell 9 is set in the Event Result, whereas information concerning the femtocell 9 (the $PSC_{Cell9}$ and the time difference $OTD_{Cell9}$ between the reference times of the UE 16 and the femtocell 9) and information concerning the macrocell 13 (the $PSC_{Cell13}$ and the time difference $OTD_{Cell13}$ between the reference times of the UE 16 and the macrocell 13) are set in the Measured Result. The time difference OTD handled here refers to a frame offset and a chip offset between the SFN (System Frame Number) of a physical channel, which is the primary CCPCH (Common Control Physical Channel), of the femtocell 9/macrocell 13 and the RLC Transparent Mode COUNT-C in the UE 16. The OTD is represented by three parameters, COUNT-C-SFN high, OFF, and Tm, in 3GPP TS25.331 V11.4.0 (2013-1) Radio Resource Control (RRC); Protocol specification (Release 11).

The RNC 14, when receiving the Measurement Report message, uses an internally provided handover routing table to determine, based on the $PSC_{Cell9}$ in the Event Result, that the target cell is a cell under the control of the GW 1 (here, any one of the cells included in the virtual cell 3), and then sends a RANAP: Relocation Required (handover request) message to the core network 15 (Operation S36). In this Relocation Required message, the following are set:
1) Target ID (target identification information);
2) Target Cell Identity (target cell identification information);
3) UE History Information; and
4) Source RNC to Target RNC Transparent Container.
Here, the identification information of the GW 1 is set as Target ID, and the identification information of a cell (virtual cell ID) under the control of the GW 1 is set as Target Cell Identity. Further, a set of the Cell Identity of a cell where the UE 16 stayed, as IE Cell Identity, and a duration of time the UE 16 stayed in this cell as IE UE Stayed in Cell, is set in UE History Information, with respect to each cell where the UE 16 has stayed in the past. Moreover, the Measurement Report received from the UE 16 is set in Source RNC to Target RNC Transparent Container.

The GW 1 receives a RANAP: Relocation Request (handover request) message from the core network 15 (Operation S36). In the RANAP: Relocation Request message, the following are set:
1) Target Cell Identity;
2) UE History Information; and
3) Source RNC to Target RNC Transparent Container.

Here, a Cell Identity indicating a cell (virtual cell) under the control of the GW 1 is set in Target Cell Identity, and the Measurement Report received from the UE 16 is set in Source RNC to Target RNC Transparent Container.

When the GW 1 receives the RANAP: Relocation Request message, the control section 105 compares the information of the received RANAP: Relocation Request message with the information registered in the database 104, thus identifying the Cell Identify of the femtocell 9 formed by the HNB 6 as the handover-target cell and selecting the GW 2 to which the HNB 6 is connected as the destination of the message (Operation S37).

Subsequently, the control section 105 sends from the lower-level apparatus communication section 102 the RANAP: Relocation Request message in which the Cell Identity of the femtocell 9 is set as Target Cell Identity and the address of the GW 2 is set as the destination (Operation S38). The control section 205 of the GW 2 having received this RANAP: Relocation Request message can find from Target Cell Identity in this message that this concerns a procedure for hand-in to the femtocell 9 of the HNB 6.

3.4) Selection of Handover Target

Figure 14:
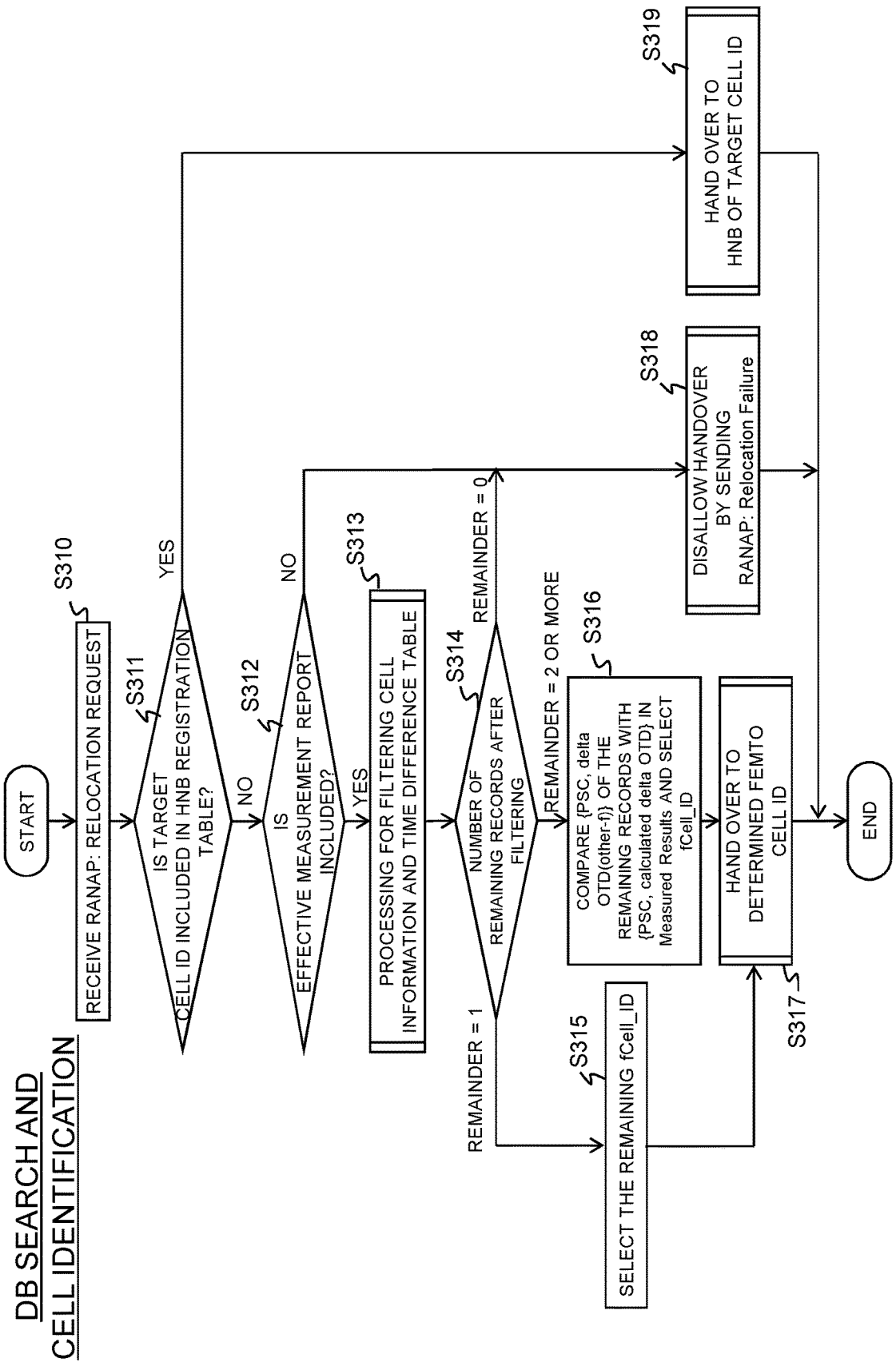
FIG. 14 is a flowchart showing search and cell identification operations using a database in the first example.

Referring to FIG. 14, when the GW 1 receives a RANAP: Relocation Request message via the communication section 101 from the core network 15 (Operation S310), the control section 105 checks whether or not a Target Cell Identity included in this received message is included in the HNB registration table of the database 104 (Operation S311). If it is not included (Operation S311; NO), the control section 105 further checks whether or not Measurement Report is correctly set (Operation S312). For example, it is checked whether or not event information is one indicating a handover target, such as Intra-Frequency Measurement Event 1a, 1c or 1e, and whether or not two or more pieces of OTD (Observed Time Difference) information are set with respect to a cell that corresponds to a Target PSC set in Event Result.

If Measurement Report is correctly set (Operation S312; YES), the control section 105 performs filtering by using the cell information and time difference table in the database 104, based on the various information set in the RANAP: Relocation Request message (Operation S313). This filtering processing will be described later.

Subsequently, the control section 105 checks the number of records (the number of candidates) remaining after the filtering (Operation S314) and, if one candidate remains, selects the Cell Identity of a femtocell that corresponds to this candidate (Operation S315). If two or more candidates remain, a delta_OTD calculated based on the OTD information included in Measured Result in the RANAP: Relocation Request message is compared with the additional information of the remaining candidates, namely, delta_OTD(other-f), which is the difference between the OTD with respect to another cell and the OTD with respect to the femtocell, whereby only one candidate that matches the most is selected, and the Cell Identity of a femtocell is thus identified (Operation S316). Since any delta_OTD information is information on neighboring cell excluding the target cell and the macrocell, a femtocell can be identified with higher probability as there are more and more neighboring cell information that includes matching delta_OTD information. Note that a specific example of a method for calculating a delta_OTD from OTD information included in Measured Result will be described later.

When the Cell Identity of a femtocell is thus determined through Operations S315 and S316, the control section 105 sets the determined Cell Identity in Target Cell Identity of the RANAP: Relocation Request message and acquires the address of a HNB/GW corresponding to this Cell Identity from the HNB registration table to set it as the destination. Thus, the RANAP: Relocation Request message can be sent to the HNB 6 of the femtocell 9, and handover to the femtocell 9 can be performed (Operation S317).

When Measurement Report is not correctly set (Operation S312; NO), or when the number of candidates is zero in Operation S314, then the control section 105 determines a failure of handover and sends a RANAP: Relocation Failure to the core network 15, thus disallowing the handover (Operation S318). Moreover, if a Target Cell Identity included in the received RANAP: Relocation Request message is included in the HNB registration table of the database 104 (Operation S311; YES), it is determined that the Target Cell Identity is already identified as a unique cell by the RNC 14 or core network 15, and the RANAP: Relocation Request message is sent to the address of a HNB/GW corresponding to this Cell Identity, which is acquired from the HNB registration table (Operation S319).

<Calculation of Delta_OTD>

A specific example of a method for calculating a delta_OTD from Measured Results in the above-described Operation S316 will be shown below. Note that this calculation method is also used in the above-described filtering processing in Operation S313 (see Operation S336 in FIG. 15, which will be described later).

An OTD is the difference between the RLC of a P-CCPCH, which is the reference time of a cell, and the Transparent Mode Count-C, which is the reference time of a UE, and is composed of IE COUNT-C-SFN high, OFF, and Tm. OTD information, along with the PSC of each cell measured by a UE as a set, is included in Measured Result in a Measurement Report to be sent from the UE. The PSC of the macrocell 13 is generally included in Measured Result in Measurement Report, whereas the PSC of the femtocell 9 is included in Event Result in Measurement Report. OTD_macro, OTD_femto, and delta OTD(m–f) are calculated by using the following equations.

$$OTD\_macro = (COUNT\text{-}C\text{-}SFN\ high(macro))*256 + OFF(macro))*38400 + Tm(macro)$$

$$OTD\_femto = (COUNT\text{-}C\text{-}SFN\ high(femto))*256 + OFF(femto))*38400 + Tm(femto)$$

$$delta\_OTD(m\text{--}f) = [(OTD\_macro - OTD\_femto) + 4096*38400]\ mod(4096*38400)$$

Note that they can also be calculated as follows, based on the definitions in 3GPP TS25.215 version 11.0.0 Physical layer-Measurements (FDD) (Release 11).

$$OTD\_macro = OFF(macro)*38400 + Tm(macro)$$

$$OTD\_femto = OFF(femto)*38400 + Tm(femto)$$

$$delta\_OTD(m\text{--}f) = [(OTD\_macro - OTD\_femto) + 256*38400]\ mod(256*38400)$$

<Filtering Processing S313>

Hereinafter, the filtering processing (Operation S313 in FIG. 14) using the cell information and time difference table illustrated in FIG. 7 will be described with reference to FIG. 15. A description will be given below of a filtering processing procedure using, for filtering keys, a set of femtocell PSC, macrocell ID, virtual cell ID, and PSC-delta_OTD. However, these filtering keys may be applied in any order, and the order of processing shown in FIG. 15 is an example.

Figure 15:
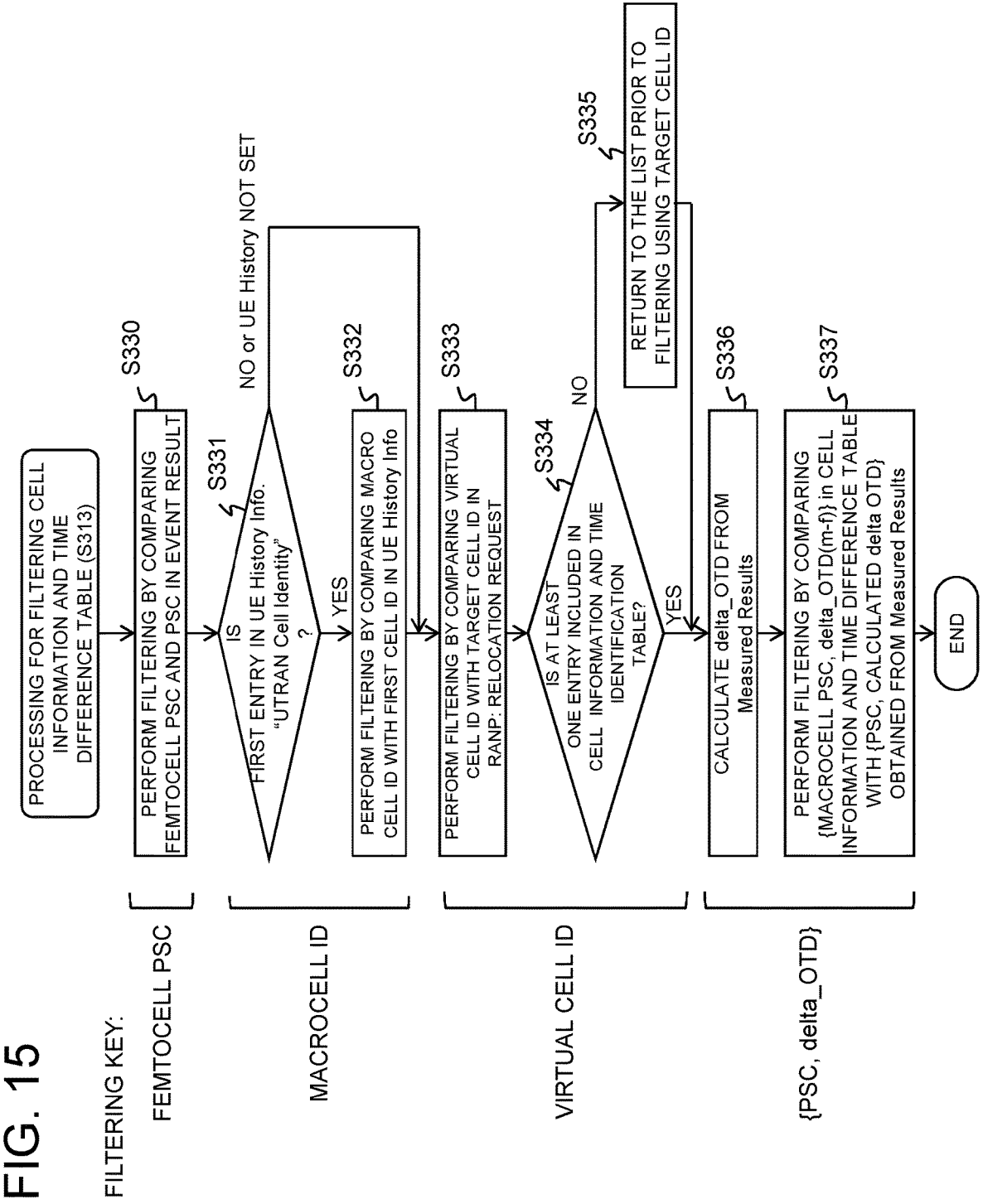
FIG. 15 is a flowchart showing filtering operations in FIG. 14.

Referring to FIG. 15, processing that uses femtocell PSC for a filtering key is as follows. In the cell information and time difference table, only candidates are left that match a PSC of Event Result included in a RANAP: Relocation Request message (Operation S330).

Processing that uses macrocell ID for a filtering key is as follows. It is checked whether or not a UTRAN Cell Identity is set in the first entry of UE History Information (Operation S331). If a UTRAN Cell Identity is set in the first entry in UE History Information (Operation S331; YES), only candidates are left whose macrocell identification information in the cell information and time difference table matches the cell identification information set in the first entry of UE History Information included in the RANAP: Relocation Request message (Operation S332).

Processing that uses virtual cell identification information for a filtering key is as follows. Only candidates are left that any one of virtual cell identification information in the cell information and time difference table matches target cell identification information (Target Cell Identity) included in the RANAP: Relocation Request message (S333). Subsequently, the control section 105 determines whether or not at least one candidate remains in the cell information and time difference table (Operation S334). When no candidate remains (Operation S334; NO), the state is brought back to that before the filtering processing in Operation S333 is performed (Operation S335). If any candidate or candidates remain (Operation S334; YES), the process directly advances to the next processing.

Processing that uses a set of PSC and delta_OTD for a filtering key is as follows. First, the control section 105 calculates a delta_OTD from Measured Results in the received RANAP: Relocation Request message (Operation S336). The delta_OTD calculation is as described above. Subsequently, only candidates are left whose [macrocell PSC, delta_OTD(m–f)] of the cell information and time difference table matches [PSC, calculated delta_OTD(m–f)] obtained from the Measured Results (Operation S337). Note that in delta_OTD comparison, it is also possible to provide a delta_OTD value with an allowance for deciding on whether to be identical or not, in consideration of the possibility that a deviation of several chips may occur due to a drift of a cell reference signal caused by radio propagation distance and long-time operation, as described already. For example, in case of a delta_OTD allowance of 1000 and a delta_OTD value of 10000, it may be determined that the delta_OTD values ranging from 9000 to 11000 indicate a cell having the same delta_OTD information.

3.5) Hand-Out Phase

Next, a brief description will be given of operations in case of hand-out of the UE 16 located in the femtocell 9 to the macrocell 13. However, if a macrocell ID is included in Neighbour Information in the HNB registration phase as described above, cell information acquisition through the hand-out phase described below is not required. Moreover, even if a macrocell ID is not included, it is possible to identify a cell through the filtering processing shown in FIG. 15.

Figure 16:
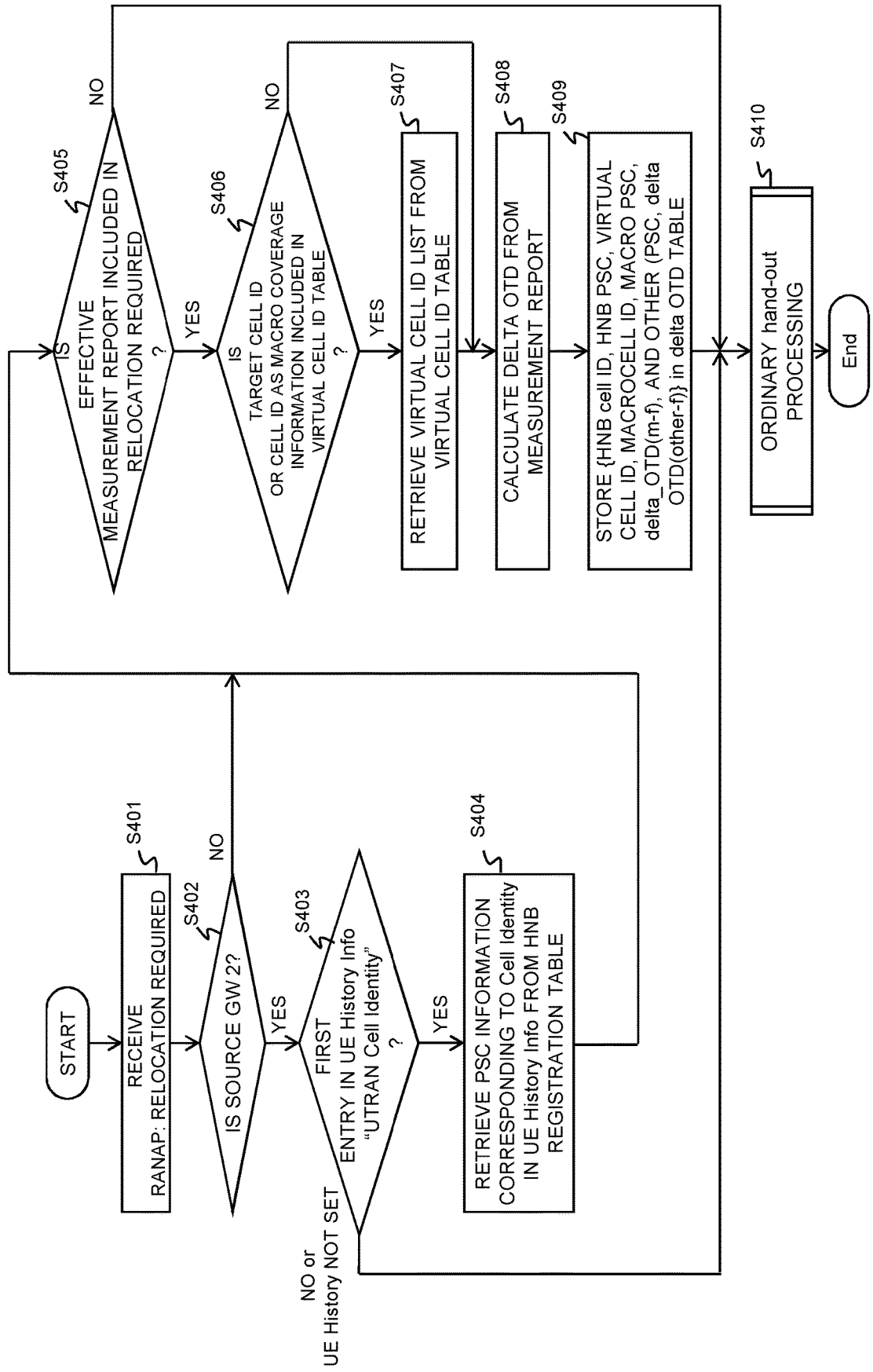
FIG. 16 is a flowchart showing hand-out operations in the first example.

Referring to FIG. 16, the control section 105 of the GW 1, when receiving a RANAP: Relocation Required message from a lower-level apparatus (Operation S401), determines whether or not the source is the GW 2 (Operation S402). It can be found whether the source is the GW or is a HNB, based on the source address, SCTP (Stream Control Transmission Protocol) link information, lower-layer information, or the like. When the source is the GW 2 (Operation S402; YES), it is determined whether or not a UTRAN Cell Identity is set in UE History Information (Operation S403). If it is set (Operation S403; YES), PSC information corresponding to the Cell Identity in UE History Information is retrieved from the HNB registration table (Operation S404).

Subsequently, it is determined whether or not Measurement Report is correctly set in the RANAP: Relocation Required message (Operation S405). Specifically, it is determined as in the determination method described at Operation S312 in FIG. 14. If Measurement Report is correctly set (Operation S405; YES), it is determined whether or not either target cell identification information set in the RANAP: Relocation Required message or cell identification information of information on macro coverage in the neighborhood of the source HNB/GW of the RANAP: Relocation Required message is included in the virtual cell ID table (Operation S406). If it is included (Operation S406; YES), at least one piece of virtual cell identification information corresponding to the target cell identification information or the cell identification information of the macro coverage information is acquired from the virtual cell ID table (Operation S407).

When a list of the virtual cell identification information is acquired through Operation S407, or when target cell identification information or cell identification information of the information on macro coverage in the neighborhood of the source HNB/GW is not included in the virtual cell ID table (Operation S406; NO), the control section 105 calculates a delta_OTD from the Measurement Report of the received RANAP: Relocation Required message (Operation S408). A specific example of a calculation method is as described above.

Thus, the control section 105 stores in the cell information and time difference table of the database 104 the cell identification information and PSC of the HNB, the virtual cell ID list, the cell identification information and PSC of the macrocell, the delta_OTD between the macrocell and the femtocell, and a list of the PSCs of other cells included in Measured Results and the delta_OTDs between these other cells and the femtocell (Operation S409). Thereafter, the rest of the ordinary hand-out procedure is performed (Operation S410).

3.6) Effects

As described above, according to the first example of the present invention, the GW 2 notifies the higher-level GW 1 of cell information concerning the cells 7 to 9 under the control of the GW 2 by using a HNB registration/update message, and the GW 1 uses this to construct a cell information-related database. In case of hand-in of the UE 16 that is wirelessly connected to the NodeB 12 of the macrocell 13 from the macrocell 13 to the femtocell 9 under the control of the GW 2, the GW 1, when receiving a request for this handover from the RNC 14, refers to the cell information registered in the database, whereby the GW 1 can find that the target cell of this handover is the femtocell 9 under the control of the GW 2, and can send the handover request to the HNB 6 via the GW 2.

More specifically, since the GW 2 sends the cell identification information and PSC information of HNBs to the GW 1, the GW 1 can store the fact that the cell identification information and PSC information of the HNBs are information under the control of the GW 2. Accordingly, in hand-in, the GW 1 can identify a target cell and also can determine the destination of a handover request message, whereby even when the UE 16 moves, it is possible to maintain a radio communication connection without disconnection.

Moreover, the database at the GW 1 stores the address information of HNBs/GWs under its control that have cell identification information, as the HNB registration table. Accordingly, in hand-in phase, when a target cell can be correctly identified with target cell identification information in a handover request message, it is possible to uniquely determine the destination address of the handover request message based on the database, without using the cell information and time difference table.

Further, the database at the GW 1 stores virtual cell identification information corresponding to macrocell identification information, as the virtual cell ID table. Accordingly, in hand-in phase, it is possible to filter the cell information and time difference table by using target cell identification information in a handover request message, and so the probability of identifying a target cell can be increased.

Furthermore, since a message the GW 2 sends to the GW 1 includes femtocell-macrocell delta_OTD information, the GW 1 can construct the cell information and time difference table. Accordingly, in hand-in phase, the GW 1 can identify a target cell.

Moreover, with a message the GW 2 sends to the GW 1, updated information can be sent each time the addition/reduction of a femtocell or a change in Cell Identity, PSC, neighboring macrocell, or femtocell-macrocell delta_OTD is detected. Accordingly, the GW 1 can construct the cell information and time difference table up to date.

Moreover, the GW 2, considering changes in femtocell-macrocell delta_OTD, is provided with the mechanism that the GW 2 sends a message to the GW 1 only when a predetermined threshold is exceeded. With this mechanism, it is not necessary to frequently send an update message for the GW 1 to construct the cell information and time difference table up to date, which contributes to a reduction in network loads.

Moreover, when the GW 1 determines cell coidentity based on the information in the cell information and time difference table, cell coidentity is determined if a value falls within a predetermined threshold range. Accordingly, a target cell can be identified even if there are some fluctuations in femtocell-macrocell delta_OTD.

Moreover, management of the femtocell identification information of HNBs, the address information of the GW 2 to which the HNBs are connected, and the cell information and time difference table is facilitated for the GW1, and a hand-out phase prior to a hand-in phase as described in NPLs 1 and 2 is not required.

4. Second Example

According to a second example of the present invention, database information at the GW 1 is constructed by using a handover request message at the time of hand-out of the terminal UE 16 from the femtocell 9 to the macrocell 13. Hereinafter, operations for registration/update of cell information in hand-out phase will be described with reference to FIGS. 17 and 18.

4.1) Cell Information Registration/Update Operations

Figure 17:
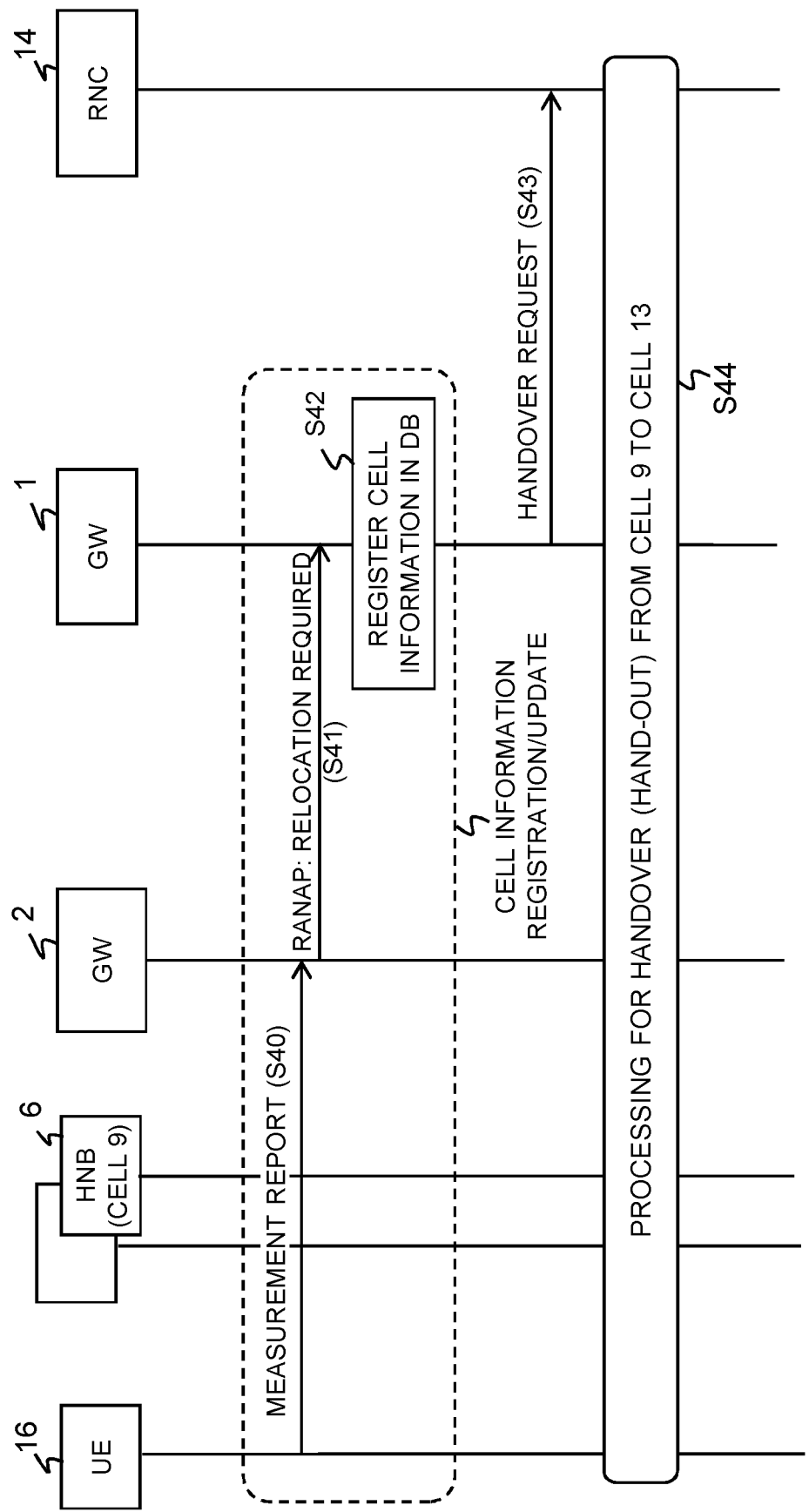
FIG. 17 is a sequence diagram showing a hand-out phase in a method for selecting a handover-target cell according to a second example of the present invention.
Figure 18:
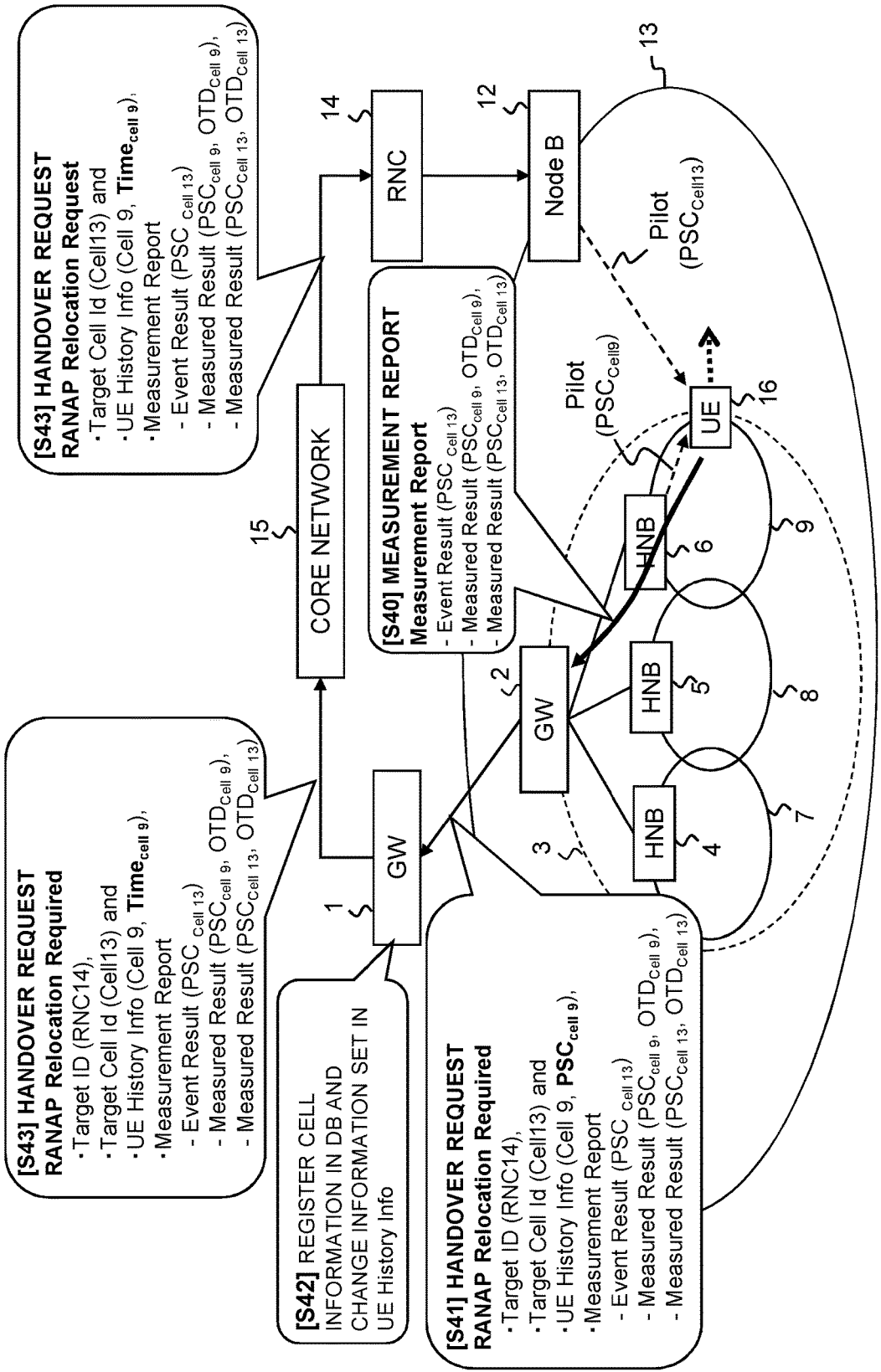
FIG. 18 is a schematic system architecture diagram showing a sequence in hand-out phase in the second example.

Referring to FIGS. 17 and 18, the UE 16 receives $PSC_{Cell9}$ from a pilot signal of the femtocell 9 and $PSC_{Cell13}$ from a pilot signal of the macrocell 13 while it is wirelessly connected to the HNB 6 within the femtocell 9. The UE 16 sends a Measurement Report to GW 2 via the HNB 6, based on the measured result that pilot received power from the macrocell 13 is larger than pilot received power from the femtocell 9 (Operation S40).

This Measurement Report includes Event Result and Measured Result, wherein the $PSC_{Cell13}$ of the macrocell 13 is set in the Event Result, whereas information concerning the macrocell 13 (the $PSC_{Cell13}$ and the time difference $OTD_{Cell13}$ between the reference times of the UE 16 and the macrocell 13) and information concerning the femtocell 9 (the $PSC_{Cell9}$ and the time difference $OTD_{Cell9}$ between the reference times of the UE 16 and the femtocell 9) are set in the Measured Result. The time difference OTD handled here includes a frame offset and a chip offset between the SFN (System Frame Number) of a physical channel, which is the primary CCPCH (Common Control Physical Channel), of the femtocell 9/macrocell 13 and the RLC Transparent Mode COUNT-C in the UE 16. The OTD is represented by three parameters, COUNT-C-SFN high, OFF, and Tm, in 3GPP TS25.331 V11.4.0 (2013-1) Radio Resource Control (RRC); Protocol specification (Release 11).

The GW 2, when receiving the Measurement Report message, constructs a RANAP: Relocation Required (handover request) message as described in 3GPP TS 25.413 V11.2.0 (2012-12) UTRAN Iu interface Radio Access Network Application Part (RANAP) signalling (Release 11) and sends it to the GW 1 (Operation S41). In this Relocation Required message, the following are set:
1) Target ID (target identification information);
2) Target Cell Identity (target cell identification information);
3) UE History Information; and
4) Source RNC to Target RNC Transparent Container.

Here, the identification information of the RNC 14 is set as Target ID, and the cell identification information of the macrocell 13 is set as Target Cell Identity. Further, a set of the identification information of the femtocell 9 where the UE 16 has stayed, as IE Cell Identity, and the PSC thereof is set in UE History Information.

The GW 1, when receiving the RANAP: Relocation Required (handover request) message, constructs a HNB registration table and a cell information and time difference table in the database 104, based on the contents of the received RANAP: Relocation Request message (Operation S42). Further, the GW 1 sends a RANAP: Relocation Required message to the core network 15 (Operation S43). The structure of this RANAP: Relocation Required message in Operation S43 is equal to the RANAP: Relocation Required message in Operation S41, except the following.

That is, the PSC information of the cell prior to handover (here, $PSC_{Cell19}$), which is included in the RANAP: Relocation Required message in Operation S41, is deleted. In UE History Information of the RANAP: Relocation Required message in Operation S43, the identification information of a cell where the UE 16 stayed (here, the cell 9) and a duration of time the UE 16 stayed in the cell in the past (here, $Time_{Cell9}$) are set as IE Cell Identity and IE UE Stayed in Cell, respectively, which are set as many as the number of cells where the UE 16 stayed.

When the RNC 14 receives the RANAP: Relocation Request message from the GW 1 via the core network 15, thereafter ordinary handover processing is performed. Note that the handover request message may be sent directly from the GW 1 to the RNS 14, not via the core network 15.

<Registration of Cell Information>

Figure 19:
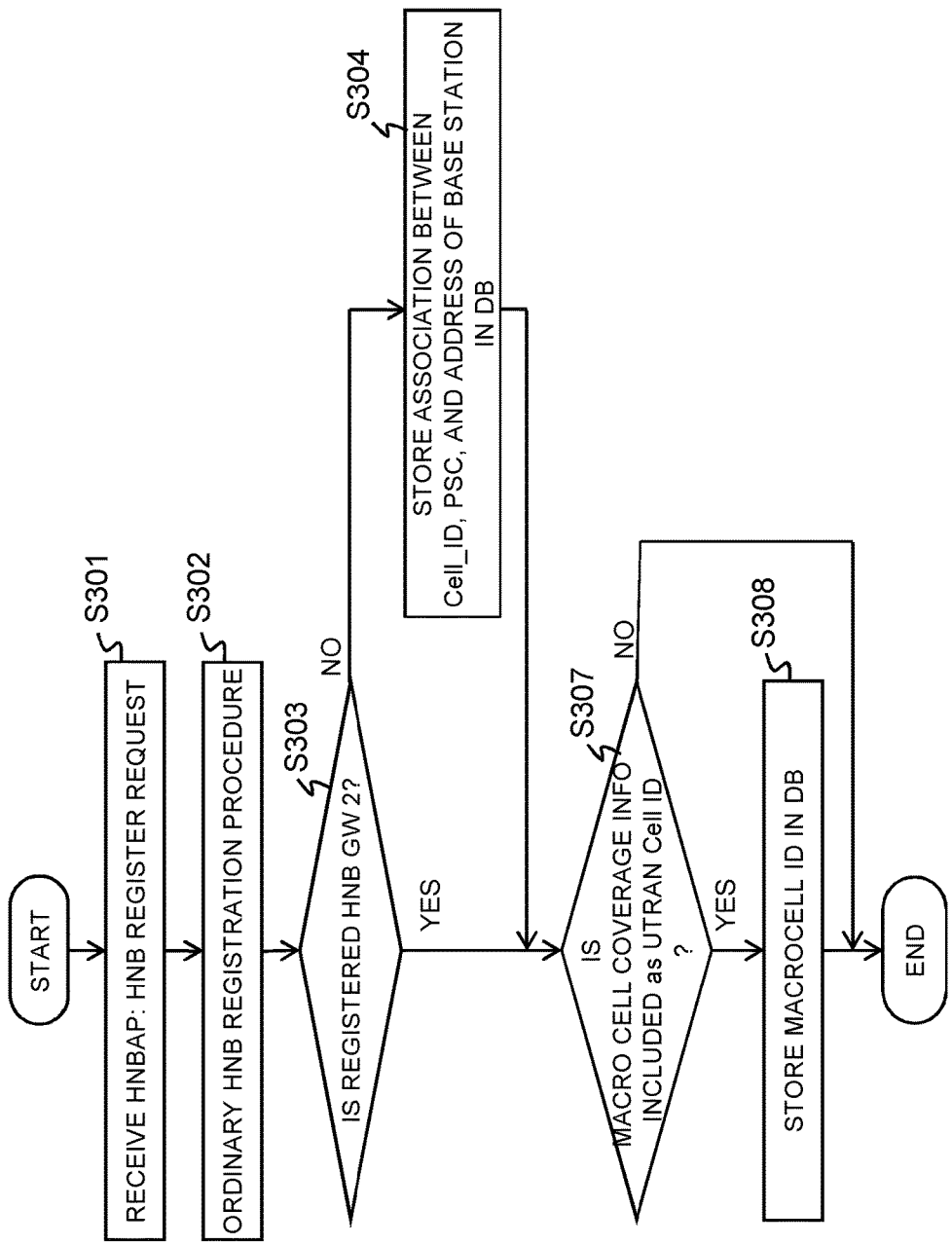
FIG. 19 is a flowchart showing cell information registration operations in the second example.

A cell information registration procedure in the second example is similar to the registration procedure (Operations S301 to S308) in the first example shown in FIG. 12, excluding Operations S305 and S306, as shown in FIG. 19.

That is, referring to FIG. 19, if a registered HNB is a HNB having a single femtocell (Operation S303; NO), the control section 105 registers a combination of the Cell Identity, PSC, and address of the HNB in the base station registration table of the database 104 (Operation S304). When the registration in Operation S304 is completed, or when a registered HNB is the GW 2 that has a plurality of femtocells (Operation S303; YES), then the control section 105 determines whether or not a macrocell neighboring to the HNB/GW is set in the received HNB REGISTER REQUEST message (Operation S307). The following operations are not performed: determination as to whether or not Local Cell Information is included in the HNB REGISTER REQUEST message (Operation S305); and registration in the HNB registration table (Operation S306).

<Registration of Cell Information at the Time of Hand-Out>

As shown in FIG. 20, a hand-out procedure in the second example is different from the hand-out procedure (Operations S401 to S410) in the first example shown in FIG. 16 only in Operation S404.

Referring to FIG. 20, the control section 105 of the GW 1, when receiving a RANAP: Relocation Required message from a lower-level apparatus (Operation S401), determines whether or not the source is the GW 2 (Operation S402). It can be found whether the source is a GW or is a HNB, based on the source address, SCTP (Stream Control Transmission Protocol) link information, lower-layer information, or the like. When the source is the GW 2 (Operation S402; YES), it is determined whether or not a UTRAN Cell Identity is set in UE History Information (Operation S403). If it is set (Operation S403; YES), the cell identification information and PSCs of HNBs and the address information of the GW 2 are stored in the HNB registration table of the database 104 (Operation S404*a*).

Subsequently, it is determined whether or not Measurement Report is correctly set in the RANAP: Relocation Required message (Operation S405). Specifically, it is determined as in the determination method described at Operation S312 in FIG. 14. If Measurement Report is correctly set (Operation S405; YES), it is determined whether or not either target cell identification information set in the RANAP: Relocation Required message or cell identification information of information on macro coverage in the neighborhood of the source HNB/GW of the RANAP: Relocation Required message is included in the virtual cell ID table (Operation S406). If it is included (Operation S406; YES), at least one piece of virtual cell identification information corresponding to the target cell identification information or the cell identification information of the macro coverage information is acquired from the virtual cell ID table (Operation S407).

When a list of the virtual cell identification information is acquired through Operation S407, or when target cell identification information or cell identification information of information on macro coverage in the neighborhood of the source HNB/GW is not included in the virtual cell ID table (Operation S406; NO), the control section 105 calculates a delta_OTD based on the Measurement Report of the received RANAP: Relocation Required message (Operation S408). A specific example of a calculation method is as described above.

Thus, the control section 105 stores in the cell information and time difference table of the database 104 the cell identification information and PSCs of the HNBs, the virtual cell ID list, the cell identification information and PSC of the macrocell, the macrocell-femtocell delta_OTD, and a list of the PSCs of other cells included in Measured Results and the delta_OTDs between these other cells and the femtocell (Operation S409). Thereafter, the rest of an ordinary hand-out procedure is performed (Operation S410).

4.2) Hand-in Phase

The HNB registration table, virtual cell ID table, and cell information and time difference table of the database 104 are constructed as described above, and this database information is used, whereby a hand-in procedure as described in FIGS. 13 and 14 can be performed as in the first example.

4.3) Effects

As described above, according to the second example of the present invention, the following effects can be obtained.

First, cell information related to the cells 7 to 9 under the control of the GW 2 is notified to the higher-level GW 1 by using a handover request message, which is notified from the GW 2 to the GW1, and the GW 1 uses this to construct a cell information-related database. In case of hand-in of the UE 16 that is wirelessly connected to the NodeB 12 of the macrocell 13 from the macrocell 13 to the femtocell 9 under the control of the GW 2, the GW 1, when receiving a request for this handover from the RNC 14, refers to the cell information registered in the database, whereby the GW 1 can find that the target cell of this handover is the femtocell 9 under the control of the GW 2, and can send the handover request to the HNB 6 via the GW 2.

More specifically, since the GW 2 sends the cell identification information and PSC information of HNBs to the GW1, the GW 1 can store the fact that the cell identification information and PSC information of the HNBs is information under the control of the GW 2. Accordingly, in hand-in, the GW 1 can identify a target cell and also can determine the destination of a handover request message, and so even if the UE 16 moves, its radio communication connection can be maintained without disconnection.

Moreover, in hand-out phase, in addition to the cell identification information and PSC information of the HNBs, existing IE Cell Identity and Time UE Stayed In Cell IE are also set as IE Cell Identity and Time UE Stayed In Cell IE in UE History Information in a RANAP: Relocation Required message to be sent from the GW 2 to the GW 1. Further, only existing IE Cell Identity and Time UE Stayed In Cell IE are set as IE Cell Identity and Time UE Stayed In Cell IE in UE History Information within a RANAP: Relocation Required message to be sent by the GW 1 to the RNC 15. Accordingly, it is not necessary to add a new parameter to a handover request message to be sent from the GW 1 to the RNC 14, and so the core network 15 and RNC 14 can use handover request message configuration at the time of hand-out as ordinary.

Furthermore, the database at the GW 1 stores the address information of HNBs/GWs under its control that have cell identification information, as a HNB registration table. Accordingly, in hand-in phase, if a target cell can be correctly identified with target cell identification information in a handover request message, the destination address of the handover request message can be uniquely determined based on the database, without using the cell information and time difference table.

The GW 1 stores a virtual cell ID table corresponding to the identification information of a macrocell in the internal database 104. Accordingly, in hand-out phase, it is possible to store in the cell information and time difference table also a virtual cell ID list associated with a macrocell that is the target cell or a macrocell neighboring to a HNB/GW 2. Thus, in hand-in phase, it is possible to filter the cell information and time difference table by using target cell identification information in a RANAP Relocation Request message, and so the probability of identifying a target cell can be increased.

In the HNB registration procedure with respect to a HNB/GW 2, the GW 1 automatically constructs a combination of cell identification information and the address information of a HNB/GW 2 having this cell identification information in the internal database 104. Accordingly, in hand-in phase, if a target cell can be correctly identified with target cell identification information in a RANAP Relocation Request message, it is possible to determine the destination address of the RANAP Relocation Request message based on the database 104.

In hand-out phase, the GW 1 automatically constructs, based on UE History Information of a RANAP: Relocation Required message, a combination of the cell identification information of HNBs and the address information of the GW 2 that is the source of the RANAP: Relocation Required message, in the internal database 104. Accordingly, in hand-in phase, if a target cell can be correctly identified with target cell identification information in a RANAP Relocation Request message, it is possible to determine the destination address of the RANAP Relocation Request message based on the database 104.

Further, the GW 1 provides delta_OTD information in the cell information and difference time table with an allowance used at the time of coidentity determination. Accordingly, the GW 1 can determine cell coidentity even if deviation occurs in OTD due to a difference in propagation distance caused by different handover locations within a cell and consequently deviation also occurs in delta_OTD information, whereby it is possible to increase the probability of identifying a target cell. Furthermore, a similar effect can also be obtained even if some deviation occurs in the timing of cell reference signal transmission due to the long-time operation of a cell.

5. Other Examples

Methods for the GW 1 to know a combination of the cell identification information and PSC of a HNB include the above-described method using a HNB registration/update message as in the first example, and the method using IE Time UE Stayed in Cell in UE History Information as in the second example. However, it is also possible to employ other methods, depending on a network architecture or an access system. Hereinafter, other examples will be described.

5.1) Third Example

According to a third example of the present invention, one set of Cell Identity and PSC is set in UE History Information.

In the hand-out sequence shown in FIG. 18, a plurality of sets of Cell Identity and Time UE Stayed in Cell can be set in UE History Information in a RANAP: Relocation Required message at Operation S41. In the above-described second example, in addition to the originally configured information for IE UE History Information, sets of the PSCs and cell identification information of HNBs are additionally set in Time UE Stayed in Cell IE.

On the other hand, it is also possible to employ a method in which only one set of the cell identification information and PSC of a HNB is set. In this case, at Operation S43 in FIG. 18, IE UE History Information is not set in a RANAP Relocation Required message to be sent by the GW 1 to the core network 15.

According to the third example, since the GW 2 sends the cell identification information and PSC information of a HNB to the GW1, the GW 1 can store the fact that the cell identification information and PSC information of the HNB is information under the control of the GW 2. Accordingly, in hand-in, the GW 1 can identify a target cell and also can determine the destination of a handover request message, and so even if the UE 16 moves, its radio communication connection can be maintained without disconnection.

Moreover, in hand-out phase, in addition to the cell identification information and PSC information of a HNB, existing IE Cell Identity and Time UE Stayed In Cell IE are also set as IE Cell Identity and Time UE Stayed In Cell IE in UE History Information of a RANAP: Relocation Required message to be sent from the GW 2 to the GW 1. Further, only existing IE Cell Identity and Time UE Stayed In Cell IE are set as IE Cell Identity and Time UE Stayed In Cell IE in UE History Information of a RANAP: Relocation Required message to be sent by the GW 1 to the RNC 14. Accordingly, it is not necessary to add a new parameter to a handover request message to be sent from the GW 1 to the RNC 14, and so the core network 15 and RNC 14 can use handover request message configuration at the time of hand-out as ordinary.

5.2) Fourth Example

According to a fourth example of the present invention, only two cells, a source cell and a target cell, are set as cells of measurement information to be included in Measured Result According to the fourth example, in hand-out phase, only the PSC and OTD information of a source cell and the PSC and OTD information of a target cell are set in Measured Result of Measurement Report of a RANAP Relocation Required message described at Operation S41 in FIG. 18. In this case, as to IE UE History Information, it is only necessary to set the already configured information for UE History Information. Accordingly, the same values that are set at Operation S41 in FIG. 18 can be set in IE UE History Information of a RANAP Relocation Required message to be sent by the GW 1 to the core network 15 at Operation S43.

Moreover, since a PSC set in Event Result of Measurement Report of a RANAP Relocation Required message is the PSC of a target cell, a PSC to be associated with the first Cell Identity in UE History Information should be the other PSC, not the PSC set in Event Result of Measurement Report of the RANAP Relocation Required message.

In this manner, mapping between the cell PSC and cell identification information of a HNB that is of the source cell is acquired and stored in the HNB registration table and, in addition, can also be used as information for creating a cell information and time difference table.

According to the fourth example of the present invention, since the GW 2 sends the cell identification information and PSC information of a HNB to the GW1, the GW 1 can store the fact that the cell identification information and PSC information of the HNB is information under the control of the GW 2. Accordingly, in hand-in, the GW 1 can identify a target cell and also can determine the destination of a handover request message, and so even if the UE 16 moves, its radio communication connection can be maintained without disconnection.

Moreover, the database at the GW 1 stores the address information of HNBs/GWs under its control that have cell identification information, as a HNB registration table. Accordingly, in hand-in phase, if a target cell can be correctly identified with target cell identification information in a handover request message, the destination address of the handover request message can be uniquely determined based on the database, without using the cell information and time difference table.

In the HNB registration procedure with respect to a HNB/GW 2, the GW 1 automatically constructs a combination of cell identification information and the address information of a HNB/GW 2 having this cell identification information in the internal database 104. Accordingly, in hand-in phase, if a target cell can be correctly identified with target cell identification information in a RANAP Relocation Request message, it is possible to determine the destination address of the RANAP Relocation Request message based on the database 104.

In hand-out phase, the GW 1 automatically constructs, based on UE History Information of a RANAP: Relocation Required message, a combination of the cell identification information of a HNB and the address information of the GW 2 that is the source of the RANAP: Relocation Required message, in the internal database 104. Accordingly, in hand-in phase, if a target cell can be correctly identified with target cell identification information in a RANAP Relocation Request message, it is possible to determine the destination address of the RANAP Relocation Request message based on the database 104.

5.3) Fifth Example

According to a fifth example of the present invention, the relationship between an accommodating GW 2 and a plurality of accommodated HNBs may take the following forms as long as one or more cells under the control of the GW 2 are managed as a single cell from the viewpoint of the GW 1.

a) A HNB system in which GWs and HNBs are structured in multiple stages. This can be used for in-house GWs and the like. In terms of structure, a plurality of GWs may exist in between.

b) A radio network system including a RNC and a plurality of NodeBs connected under the control of a GW.

c) A relay system including a donor base station and relay base stations. The donor base station makes wired/radio connection with one or a plurality of relay base stations. The donor base station may form a cell.

d) A C/U-separation base station system. C-plane control is centralized in a single representative system, and a plurality of U-plane radio points exist.

The present invention can also be applied to the above-described system configurations a) to d) as well.

5.4) Sixth Example

In the above-described first to fifth examples, description is given on a WCDMA technology basis. However, these examples can also be applied to other radio systems such as LTE (Long Term Evolution), GSM, and WiFi.

For example, in LTE in which a HeNBGW and a HeNB constitute one femto base station system, a second HeNBGW in an intra-network is connected to a first HeNBGW in an operator network, and under the control of the second HeNBGW, a plurality of HeNBs are connected thereto. Even in such a form, the first HeNBGW manages sets of the physical cell identification information (PCI: Physical Cell Identity) and logical cell identification information (Cell Identity) of the cells under the control of the second HeNBGW and can apply them to hand-in/out operations by using the Delta_OTDs between a macro eNB and the HeNBs.

5.5) Seventh Example

In the above-described second example, for cell measurement by a UE, Intra Frequency Measurement such as Event 1a or Event 1c is used. However, Inter Frequency Measurement and OTDOA measurement can also be used. In case of inter-frequency handover, a HNB cell can also exist at a different frequency, as a beacon cell for only broadcasting the system information of the HNB cell. It is also conceivable to only use a Tm value for delta_OTD information.

5.6) Eighth Example

According to an eighth example of the present invention, the cell information and time difference table is constructed based on inter-apparatus communication between the GW1, RNC 14, and a HNB.

In the above-described first to seventh examples, the cell information and time difference table is constructed based information set in a message. However, since the GW 1, RNC 14, HNBs, and GW 2 individually store respective reference times, they can recognize a timing difference by directly performing inter-apparatus communication. Information on the reference time of each cell is added to the inter-apparatus communication, whereby it is possible that the GW 1 constructs the cell information and time difference table.

5.7) Ninth Example

According to a ninth example of the present invention, the cell information and time difference table is constructed as a system parameter of the GW 1.

In the above-described first to eighth examples, the GW 1 itself constructs the cell information and time difference table and HNB registration table through transmission/reception of inter-apparatus messages or by using an inter-apparatus synchronization function. However, according to the ninth example, such information can be set via an external interface as well. For example, it may be input manually. Alternatively, if another node collects information related to the second relay apparatus, or if a test terminal exists that collects information on field network including the second relay apparatus, the test terminal or the other node may be configured to send the information to the first relay apparatus.

5.8) Tenth Example

According to a tenth example of the present invention, the cell information and time difference table is constructed at each of the GWs 1 and 2, individually.

In the above-described first to ninth examples, the cell information and time difference table is constructed as the database 104 stored by the GW1. However, it is also possible to provide a similar mechanism to the GW 2.

In the above-described exemplary embodiment and examples, the processing by the base stations and relay apparatuses described above may also be performed by logical circuits that are manufactured for respective purposes. Moreover, it is also possible that programs describing the contents of the processing as procedures are stored in base station- and relay apparatus-readable recording media, respectively, and the base stations and relay apparatuses are configured to read and execute the programs recorded in these recording media. The base station- and relay apparatus-readable recording media refer to memory such as ROM and RAM, HDD, and the like incorporated in the base stations and relay apparatuses, as well as removable recording media such as floppy Disk™, magneto-optical disk, DVD, and CD. The programs recorded in such recording media are read by respective CPUs (not shown) within the base stations and relay apparatuses, and processing similar to those described above is performed through control by the CPUs. Here, the CPUs are those operating as computers that execute the programs read from the recording media storing the programs.

6. Additional Statements

Part or all of the above-described exemplary embodiment also can be stated as in, but is not limited to, the following additional statements.

(Additional Statement 1)

A method of handover control in a radio communication system in which a base station controller and a first relay apparatus are connected to a communication network, wherein the base station controller has under its control at least one first base station connected thereto, and the first relay apparatus has under its control at least a second relay apparatus connected thereto, wherein the second relay apparatus has under its control at least one second base station connected thereto, characterized by comprising:

by the first relay apparatus, acquiring cell information of a cell controlled by the second base station under the control of the second relay apparatus; and by the first relay apparatus, in a hand-in phase for handover from the first base station, to which a radio station is wirelessly connected, to the second base station, identifying a target cell of the handover by using the cell information.

(Additional Statement 2)

The method of handover control according to additional statement 1, characterized in that the cell information includes logical cell identification information and physical cell identification information for identifying the cell of the under-control second base station.

(Additional Statement 3)

The method of handover control according to additional statement 2, characterized in that the first relay apparatus identifies the target cell by using physical cell identification information of the target cell, which is included in a handover request message received from the base station controller, and the cell information.

(Additional Statement 4)

The method of handover control according to additional statement 2 or 3, characterized in that the cell information further includes physical cell identification information used by a neighboring cell to the cell controlled by the second base station, and information on a time difference in reference time between the cell and the neighboring cell.

(Additional Statement 5)

The method of handover control according to additional statement 4, characterized in that the first relay apparatus identifies the target cell by using physical cell identification information of the target cell, which is included in a handover request message received from the base station controller, information on a time difference in reference time between the target cell and a source cell, and the cell information.

(Additional Statement 6)

The method of handover control according to any one of additional statements 1 to 5, characterized in that the first relay apparatus receives the cell information from outside.

(Additional Statement 7)

The method of handover control according to additional statement 6, characterized in that the second relay apparatus notifies the cell information to the first relay apparatus by using a base station registration message or a base station update message that sends information concerning the under-control second base station.

(Additional Statement 8)

The method of handover control according to additional statement 6, characterized in that the second relay apparatus notifies the cell information to the first relay apparatus by using a handover request message in a hand-out phase for handover from the second base station to the first base station.

(Additional Statement 9)

The method of handover control according to additional statement 8, characterized in that in the handover request message in the hand-out phase, physical cell identification information of a source cell of the handover is set in an information element concerning history information of the radio station, and in a handover request message to be sent from the first relay apparatus to the base station controller, ordinary information on a duration of time of stay is set in the information element concerning the history information of the radio terminal.

(Additional Statement 10)

The method of handover control according to any one of additional statements 1 to 9, characterized in that the first relay apparatus stores a base station registration table in which logical cell identification information concerning a cell of a base station under the direct control of the first relay apparatus and the cell of the second base station is associated with address information of the under-direct-control base station, the second base station, and the second relay apparatus, and searches the base station registration table by using logical cell identification information of the target cell in a handover request message received from the base station controller, and identifies the target cell and a destination address of the handover request message.

(Additional Statement 11)

The method of handover control according to any one of additional statements 1 to 10, characterized in that the first relay apparatus stores a cell information table in which logical cell identification information of a cell of the first base station, logical cell identification information of at least one virtual cell including the at least one second base station, and logical cell identification information of a cell of any second base station that neighbors to the cell of the first base station are associated with each other, and searches the cell information table by using logical cell identification information of the target cell in a handover request message received from the base station controller, and narrows down candidates for the target cell.

(Additional Statement 12)

The method of handover control according to additional statement 11, characterized in that the cell information table further includes: physical cell identification information used by a neighboring cell to the cell of the second base station; physical cell identification information used by the cell of the any second base station that neighbors to the cell of the first base station; and information on a time difference in reference time between the cell of the second base station and the neighboring cell thereto, and the candidates for the target cell are further narrowed down by searching the cell information table by using physical cell identification information of the target cell in the handover request message and information on a time difference in reference time between the target cell and a source cell.

(Additional Statement 13)

The method of handover control according to additional statement 11 or 12, characterized in that the cell information table further includes: physical cell identification information used by another cell excluding the cell of the second base station and the cell of the first base station; and information on a time difference in reference time between the other cell and the cell of the second base station, and the candidates for the target cell are further narrowed down by searching the cell information table by using physical cell identification information of the target cell in the handover request message and information on a time difference in reference time between the target cell and a source cell.

(Additional Statement 14)

The method of handover control according to any one of additional statements 4, 5, 12, and 13, characterized in that the first and second relay apparatuses provide an allowance to determine coidentity of information on a time difference in reference time between cells.

(Additional statement 15)

The method of handover control according to any one of additional statements 1 to 14, characterized in that the first relay apparatus identifies a route up to the target cell of the handover by using the cell information.

(Additional Statement 16)

A relay apparatus that is connected to a communication network to which a base station controller is connected, and has under its own control at least a lower-level relay apparatus connected thereto, wherein the base station controller has under its control at least one first base station connected thereto, and the lower-level relay apparatus has under its control at least one second base station connected thereto, characterized by comprising:

storage means for storing cell information of a cell controlled by the second base station under the control of the lower-level relay apparatus; and control means that, in a hand-in phase for handover from the first base station, to which a radio station is wirelessly connected, to the second base station, identifies a target cell of the handover by using the cell information.

(Additional Statement 17)

The relay apparatus according to additional statement 16, characterized in that the cell information includes logical cell identification information and physical cell identification information for identifying the cell of the under-control second base station.

(Additional Statement 18)

The relay apparatus according to additional statement 17, characterized in that the control means identifies the target cell by using physical cell identification information of the target cell, which is included in a handover request message received from the base station controller, and the cell information.

(Additional Statement 19)

The relay apparatus according to additional statement 17 or 18, characterized in that the cell information further includes physical cell identification information used by a neighboring cell to the cell controlled by the second base station, and information on a time difference in reference time between the cell and the neighboring cell.

(Additional Statement 20)

The relay apparatus according to additional statement 19, characterized in that the control means identifies the target cell by using physical cell identification information of the target cell, which is included in a handover request message received from the base station controller, information on a time difference in reference time between the target cell and a source cell, and the cell information.

(Additional Statement 21)

The relay apparatus according to any one of additional statements 16 to 20, characterized in that the control means receives the cell information from outside.

(Additional Statement 22)

The relay apparatus according to additional statement 21, characterized in that the control means receives the cell information from the lower-level relay apparatus by using a base station registration message or a base station update message that sends information concerning the second base station under the control of the lower-level relay apparatus.

(Additional Statement 23)

The relay apparatus according to additional statement 21, characterized in that the control means receives the cell information from the lower-level relay apparatus by using a handover request message in a hand-out phase for handover from the second base station to the first base station.

(Additional Statement 24)

The relay apparatus according to additional statement 23, characterized in that in the handover request message in the hand-out phase, physical cell identification information of a source cell of the handover is set in an information element concerning history information of the radio station, and the control means sets ordinary information on a duration of time of stay in the information element concerning the history information of the radio terminal in a handover request message to send to the base station controller.

(Additional Statement 25)

The relay apparatus according to any one of additional statements 16 to 24, characterized in that the storage means stores a base station registration table in which logical cell identification information concerning a cell of a base station under the direct control of this relay apparatus and the cell of the second base station is associated with address information of the under-direct-control base station, the second base station, and the lower-level relay apparatus, and the control means searches the base station registration table by using logical cell identification information of the target cell in a handover request message received from the base station controller, and identifies the target cell and a destination address of the handover request message.

(Additional Statement 26)

The relay apparatus according to any one of additional statements 16 to 25, characterized in that the storage means stores a cell information table in which logical cell identification information of a cell of the first base station, logical cell identification information of at least one virtual cell including the at least one second base station, and logical cell identification information of a cell of any second base station that neighbors to the cell of the first base station are associated with each other, and the control means searches the cell information table by using logical cell identification information of the target cell in a handover request message received from the base station controller, and narrows down candidates for the target cell.

(Additional Statement 27)

The relay apparatus according to additional statement 26, characterized in that the cell information table further includes: physical cell identification information used by a neighboring cell to the cell of the second base station; physical cell identification information used by the cell of the any second base station that neighbors to the cell of the first base station; and information on a time difference in reference time between the cell of the second base station and the neighboring cell thereto, and the control means further narrows down the candidates for the target cell by searching the cell information table by using physical cell identification information of the target cell in the handover request message and information on a time difference in reference time between the target cell and a source cell.

(Additional Statement 28)

The relay apparatus according to additional statement 26 or 27, characterized in that the cell information table further includes: physical cell identification information used by another cell excluding the cell of the second base station and the cell of the first base station; and information on a time difference in reference time between the other cell and the cell of the second base station, and the control means further narrows down the candidates for the target cell by searching the cell information table by using physical cell identification information of the target cell in the handover request message and information on a time difference in reference time between the target cell and a source cell.

(Additional Statement 29)

The relay apparatus according to any one of additional statements 19, 20, 27, and 28, characterized in that the control means provides an allowance to determine coidentity of information on a time difference in reference time between cells.

(Additional Statement 30)

The relay apparatus according to any one of additional statements 16 to 29, characterized in that the control means identifies a route up to the target cell of the handover by using the cell information.

(Additional Statement 31)

A method for selecting a target cell at a first relay apparatus in a radio communication system in which a base station controller and the first relay apparatus are connected to a communication network, wherein the base station controller has under its control at least one first base station connected thereto, and the first relay apparatus has under its control at least a second relay apparatus connected thereto, wherein the second relay apparatus has under its control at least one second base station connected thereto, characterized by comprising:

by storage means, storing cell information of a cell controlled by the second base station under the control of the second relay apparatus; and by control means, in a hand-in phase for handover from the first base station, to which a radio station is wirelessly connected, to the second base station, identifying a target cell of the handover by using the cell information.

(Additional Statement 32)

The method for selecting a target cell according to additional statement 31, characterized in that the cell information includes logical cell identification information and physical cell identification information for identifying the cell of the under-control second base station.

(Additional Statement 33)

The method for selecting a target cell according to additional statement 32, characterized in that the control means identifies the target cell by using physical cell identification information of the target cell, which is included in a handover request message received from the base station controller, and the cell information.

(Additional Statement 34)

The method for selecting a target cell according to additional statement 32 or 33, characterized in that the cell information further includes physical cell identification information used by a neighboring cell to the cell controlled by the second base station, and information on a time difference in reference time between the cell and the neighboring cell.

(Additional Statement 35)

The method for selecting a target cell according to additional statement 34, characterized in that the control means identifies the target cell by using physical cell identification information of the target cell, which is included in a handover request message received from the base station controller, information on a time difference in reference time between the target cell and a source cell, and the cell information.

(Additional Statement 36)

The method for selecting a target cell according to any one of additional statements 31 to 35, characterized in that the control means receives the cell information from outside.

(Additional Statement 37)

The method for selecting a target cell according to additional statement 36, characterized in that the cell information is received from the lower-level relay apparatus by using a base station registration message or a base station update message that sends information concerning the second base station under the control of the lower-level relay apparatus.

(Additional Statement 38)

The method for selecting a target cell according to additional statement 36136, characterized in that the cell information is received from the lower-level relay apparatus by using a handover request message in a hand-out phase for handover from the second base station to the first base station.

(Additional Statement 39)

The method for selecting a target cell according to additional statement 38, characterized in that in the handover request message in the hand-out phase, physical cell identification information of a source cell of the handover is set in an information element concerning history information of the radio station, and the control means sets ordinary information on a duration of time of stay in the information element concerning the history information of the radio terminal in a handover request message to send to the base station controller.

(Additional Statement 40)

The method for selecting a target cell according to any one of additional statements 31 to 39, characterized in that the storage means stores a base station registration table in which logical cell identification information concerning a cell of a base station under the direct control of this relay apparatus and the cell of the second base station is associated with address information of the under-direct-control base station, the second base station, and the second relay apparatus, and the control means searches the base station registration table by using logical cell identification information of the target cell in a handover request message received from the base station controller, and identifies the target cell and a destination address of the handover request message.

(Additional Statement 41)

The method for selecting a target cell according to any one of additional statements 31 to 40, characterized in that the storage means stores a cell information table in which logical cell identification information of a cell of the first base station, logical cell identification information of at least one virtual cell including the at least one second base station, and logical cell identification information of a cell of any second base station that neighbors to the cell of the first base station are associated with each other, and the control means searches the cell information table by using logical cell identification information of the target cell in a handover request message received from the base station controller, and narrows down candidates for the target cell.

(Additional Statement 42)

The method for selecting a target cell according to additional statement 41, characterized in that the cell information table further includes: physical cell identification information used by a neighboring cell to the cell of the second base station; physical cell identification information used by the cell of the any second base station that neighbors to the cell of the first base station; and information on a time difference in reference time between the cell of the second base station and the neighboring cell thereto, and the control means further narrows down the candidates for the target cell by searching the cell information table by using physical cell identification information of the target cell in the handover request message and information on a time difference in reference time between the target cell and a source cell.

(Additional Statement 43)

The method for selecting a target cell according to additional statement 41 or 42, characterized in that the cell information table further includes: physical cell identification information used by another cell excluding the cell of the second base station and the cell of the first base station; and information on a time difference in reference time between the other cell and the cell of the second base station, and the control means further narrows down the candidates for the target cell by searching the cell information table by using physical cell identification information of the target cell in the handover request message and information on a time difference in reference time between the target cell and a source cell.

(Additional Statement 44)

The method for selecting a target cell according to any one of additional statements 34, 35, 42, and 43, characterized in that the control means provides an allowance to determine coidentity of information on a time difference in reference time between cells.

(Additional Statement 45)

The relay apparatusmethod according to any one of additional statements 31 to 44, characterized in that the control means identifies a route up to the target cell of the handover by using the cell information.

(Additional Statement 46)

A radio communication system in which a base station controller and a first relay apparatus are connected to a communication network, wherein the base station controller has under its control at least one first base station connected thereto, and the first relay apparatus has under its control at least a second relay apparatus connected thereto, wherein the second relay apparatus has under its control at least one second base station connected thereto, characterized in that the first relay apparatus acquires cell information of a cell controlled by the second base station under the control of the second relay apparatus, and
in a hand-in phase for handover from the first base station, to which a radio station is wirelessly connected, to the second base station, the first relay apparatus identifies a target cell of the handover by using the cell information.

INDUSTRIAL APPLICABILITY

The present invention is applicable to handover control in a mobile communication system having a cell architecture.

REFERENCE SIGNS LIST

1 First relay apparatus (GW)
2 Second relay apparatus (GW)
3 Virtual cell
4-6 Base station (HNB)
7-9 Cell (femtocell)
10 Base station (HNB)
11 Cell (femtocell)
12 Base station (NodeB)
13 Cell (macrocell)
14 Base station controller (RNC)
15 Core network
101 Communication section
102 Lower-level apparatus communication section
103 Protocol message construction section
104 Database
105 Control section
201 Higher-order apparatus communication section
202 Base station communication section
203 Protocol message construction section
204 Under-control base station information storage section
205 Control section

The invention claimed is:

1. A method of a relay apparatus, the method comprising:
transmitting data to a core network; and
receiving, from another relay apparatus which has under its control a plurality of first base stations connected thereto, a message which includes cell information of one or more cells controlled respectively by the plurality of first base stations when any change occurs in a system structure of the plurality of first base stations or any change occurs in the cell information,
wherein the cell information includes a logical cell identity and a physical cell identity of each of the plurality of first base stations,
wherein the relay apparatus has under its control at least the another relay apparatus connected thereto,
wherein the another relay apparatus connects to the core network via the relay apparatus,
wherein the relay apparatus is a HGB-GW (Home Node-B GateWay) apparatus, and
wherein the another relay apparatus is another HNB-GW (Home Node-B GateWay) apparatus.

2. The method of the relay apparatus according to claim 1, wherein the physical cell identity is a Primary Scrambling Code (PSC) of a first base station from among the plurality of first base stations.

3. The method of the relay apparatus according to claim 1, wherein the cell information further includes physical cell identification information used by a neighboring cell to a target cell which is controlled by one of the plurality of first base stations, and information on a time difference in reference time between the target cell and the neighboring cell.

4. The method of the relay apparatus according to claim 1, wherein the message is a Home Node B (HNB) Configuration Update message or a HNB Register Request message.

5. The method of the relay apparatus according to claim 1, further comprising:
identifying a target cell by using the cell information in a hand-in phase for handover from a second base station which is connected to the relay apparatus to one of the first base stations.

6. The method of the relay apparatus according to claim 1, wherein the message includes cell information of a plurality of cells controlled respectively by the plurality of first base stations.

7. A relay apparatus, comprising:
a transmitter that transmits data to a core network; and
a receiver that receives, from another relay apparatus which has under its control a plurality of first base stations connected thereto, a message which includes cell information of one or more cells controlled respectively by the plurality of first base stations when any change occurs in a system structure of the first base stations or any change occurs in the cell information,
wherein the cell information includes a logical cell identity and a physical cell identity of each of the plurality of first base stations,
wherein the relay apparatus has under its control at least the another relay apparatus connected thereto,
wherein the another relay apparatus connects to the core network via the relay apparatus,
wherein the relay apparatus is a HGB-GW (Home Node-B GateWay) apparatus, and
wherein the another relay apparatus is another HNB-GW (Home Node-B GateWay) apparatus.

8. The relay apparatus according to claim 7, wherein the message is a Home Node B (HNB) Configuration Update message or a HNB Register Request message.

9. The relay apparatus according to claim 7, wherein the cell information further includes physical cell identification information used by a neighboring cell to a target cell which is controlled by one of the first base stations, and information on a time difference in reference time between the target cell and the neighboring cell.

10. The relay apparatus according to claim 7, further comprising a controller that is configured to identify a target cell by using the cell information in a hand-in phase for handover from a second base station which is connected to the relay apparatus to one of the first base stations.

11. The relay apparatus according to claim 7, wherein the message includes cell information of a plurality of cells controlled respectively by the plurality of first base stations.

12. A relay apparatus comprising:
a receiver that receivers data from a first base station;
a transmitter that transmits, to another relay apparatus, a message which includes cell information of one or more cells controlled respectively by a plurality of first base stations when any change occurs in a system structure of the first base station or any change occurs in the cell information,
wherein the cell information includes a logical cell identity and a physical cell identity of each of the plurality of first base stations,
wherein the another relay apparatus has under its control at least the relay apparatus connected thereto,
wherein the relay apparatus connects to a core network via the another relay apparatus,
wherein the relay apparatus is a HGB-GW (Home Node-B GateWay) apparatus, and
wherein the another relay apparatus is another HNB-GW (Home Node-B GateWay) apparatus.

13. The relay apparatus according to claim 12, wherein the physical cell identity is a Primary Scrambling Code (PSC) of the first base station.

14. The relay apparatus according to claim 12, wherein the message is a Home Node B (HNB) Configuration Update message or a HNB Register Request message.

15. The relay apparatus according to claim 12, further comprising:
a controller that is configured to identify a target cell by using the cell information in a hand-in phase for handover from a second base station which is connected to the relay apparatus to one of the plurality of first base stations.

16. The relay apparatus according to claim 12, wherein the cell information further includes physical cell identification information used by a neighboring cell to a target cell which is controlled by one of the plurality of first base stations, and information on a time difference in reference time between the target cell and the neighboring cell.

17. The relay apparatus according to claim 12, wherein the message includes cell information of a plurality of cells controlled respectively by the plurality of first base stations.

* * * * *

UNITED STATES PATENT AND TRADEMARK OFFICE
CERTIFICATE OF CORRECTION

PATENT NO. : 10,743,223 B2
APPLICATION NO. : 14/897166
DATED : August 11, 2020
INVENTOR(S) : Atsushi Nakata and Yoshio Ueda It is certified that error appears in the above-identified patent and that said Letters Patent is hereby corrected as shown below:

In the Specification

Column 1, Background Art, Line 44; Delete "Pas" and insert --PCIs-- therefor

Column 21, Description of Embodiments, Line 54; Delete "$PSC_{Cell19}$)," and insert --$PSC_{Cell9}$),-- therefor Column 33, Description of Embodiments, Line 55; Delete "36136," and insert --36,-- therefor Column 35, Description of Embodiments, Line 8; Delete "relay apparatusmethod" and insert --method-- therefor Signed and Sealed this
Eighth Day of December, 2020

Andrei Iancu
*Director of the United States Patent and Trademark Office*